(12) United States Patent
Nakanishi

(10) Patent No.: US 6,345,124 B1
(45) Date of Patent: Feb. 5, 2002

(54) IMAGE CONVERSION BASED ON EDGES

(75) Inventor: Naoya Nakanishi, Tokyo (JP)

(73) Assignee: Foursis Corporation, Tokyo (JP)

( * ) Notice: Subject to any disclaimer, the term of this patent is extended or adjusted under 35 U.S.C. 154(b) by 0 days.

(21) Appl. No.: 09/182,398

(22) Filed: Oct. 29, 1998

(51) Int. Cl.[7] .............................. G06K 9/36; G06K 9/48

(52) U.S. Cl. ....................................... 382/242; 382/199

(58) Field of Search .......................... 341/51; 358/261.2, 358/428–430; 375/240.02, 240.08; 382/199, 232, 239, 242, 243, 263, 266, 270, 272

(56) References Cited

U.S. PATENT DOCUMENTS

| | | | | |
|---|---|---|---|---|
| 4,566,128 A | * | 1/1986 | Araki | 382/242 |
| 4,982,293 A | * | 1/1991 | Ishii | 358/429 |
| 5,887,085 A | * | 3/1999 | Otsuka | 382/266 |
| 5,982,943 A | * | 11/1999 | Hsu et al. | 382/270 |
| 6,072,907 A | * | 6/2000 | Taylor et al. | 382/263 |

* cited by examiner

*Primary Examiner*—Timothy M. Johnson
(74) *Attorney, Agent, or Firm*—Reed Smith LLP

(57) ABSTRACT

An image processing method for processing a grayscale image, by which grayscale images of color or monochrome photographs characters and so on are processed by being converted into digital signals, and by which the data amount of image signals are compressed and grayscale images are restored from the compressed signal data.

5 Claims, 19 Drawing Sheets

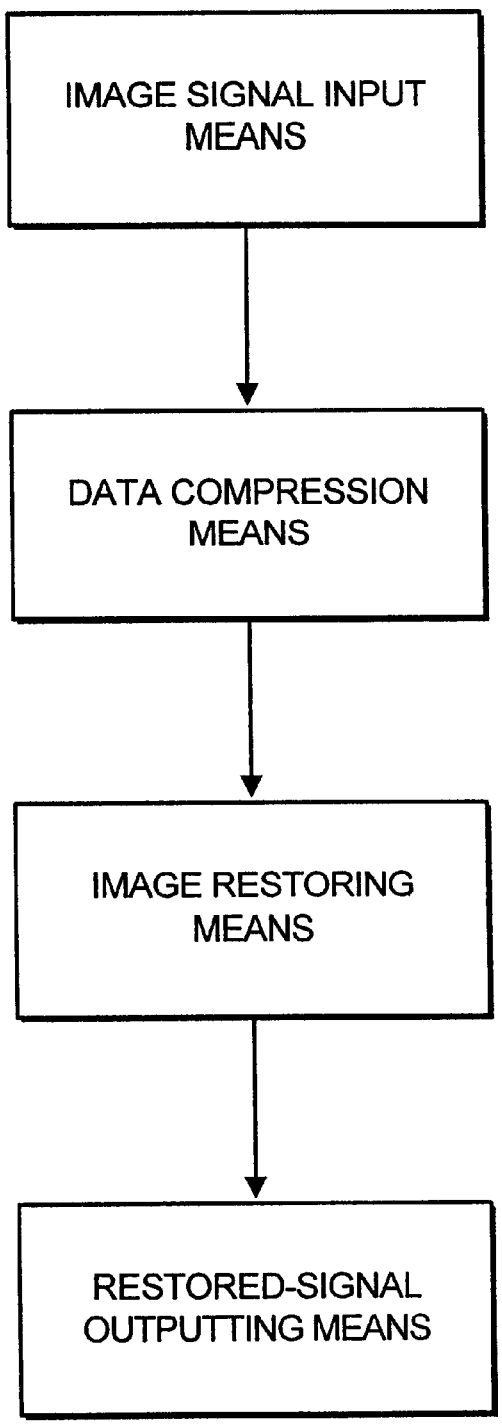
F I G. 1

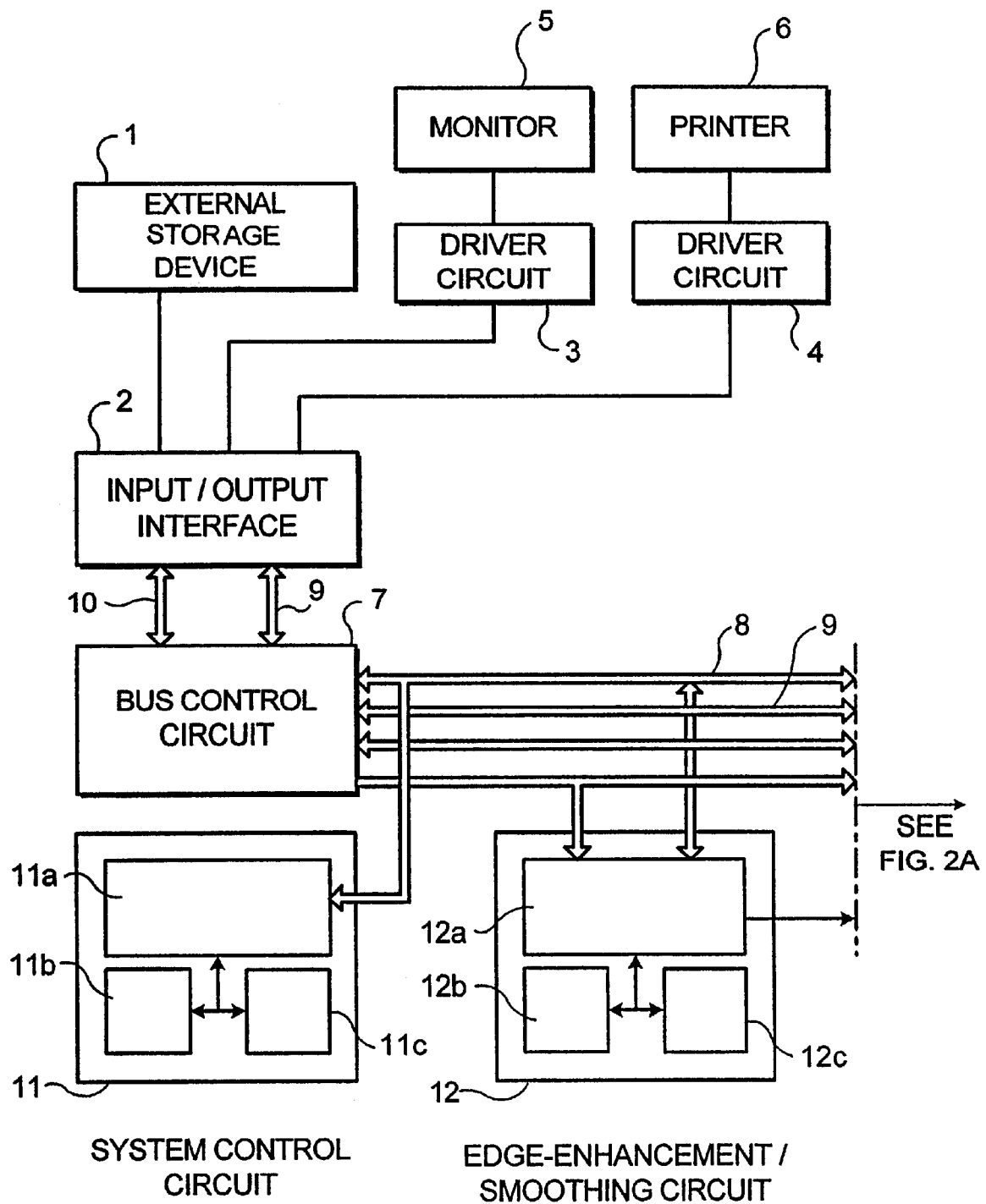
F I G. 2A

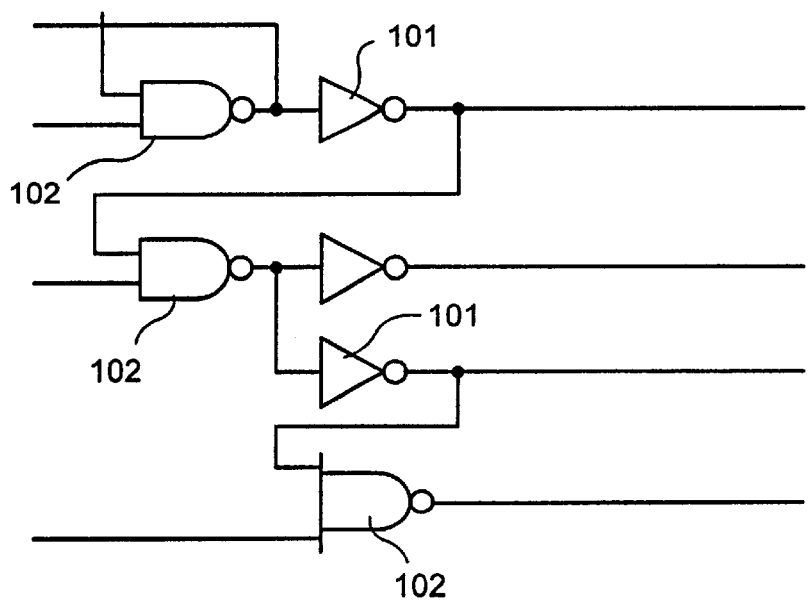
F I G. 3
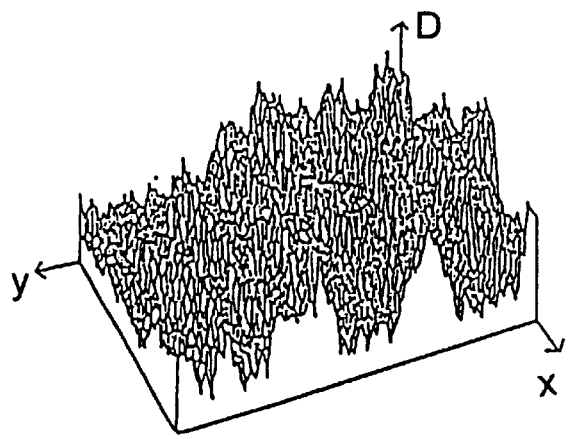
F I G. 4
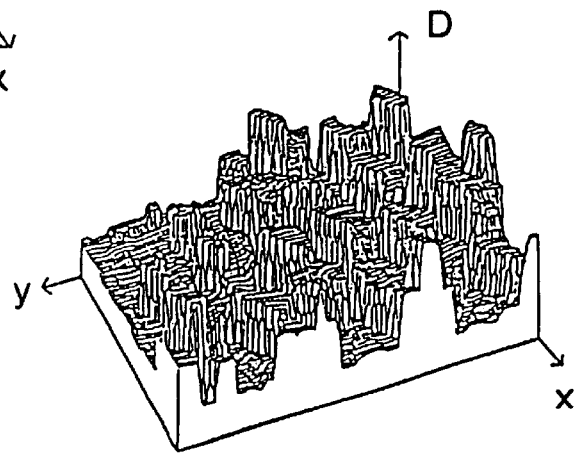
F I G. 5

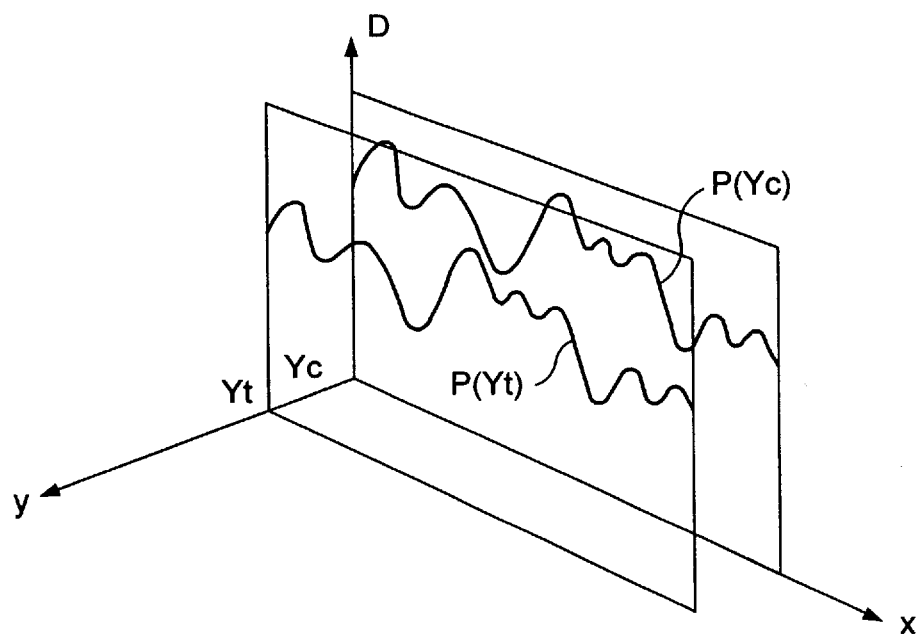
F I G. 6
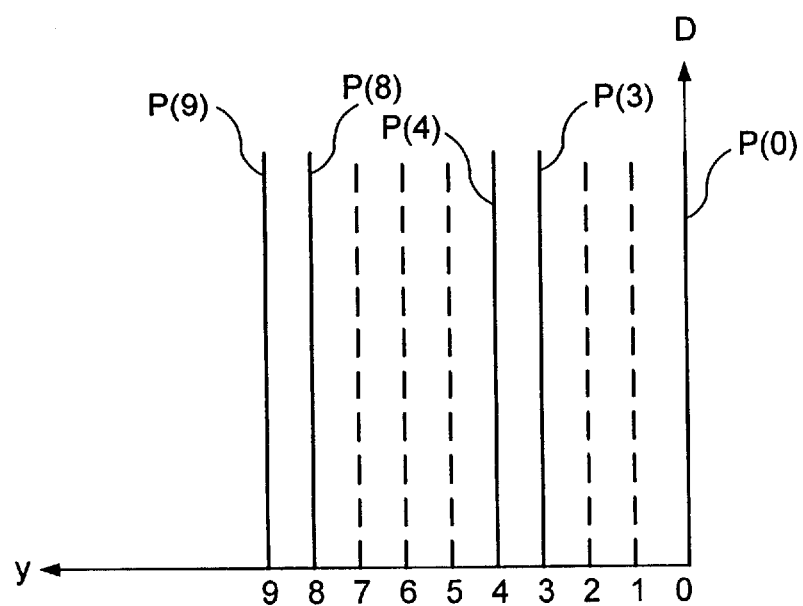
F I G. 7

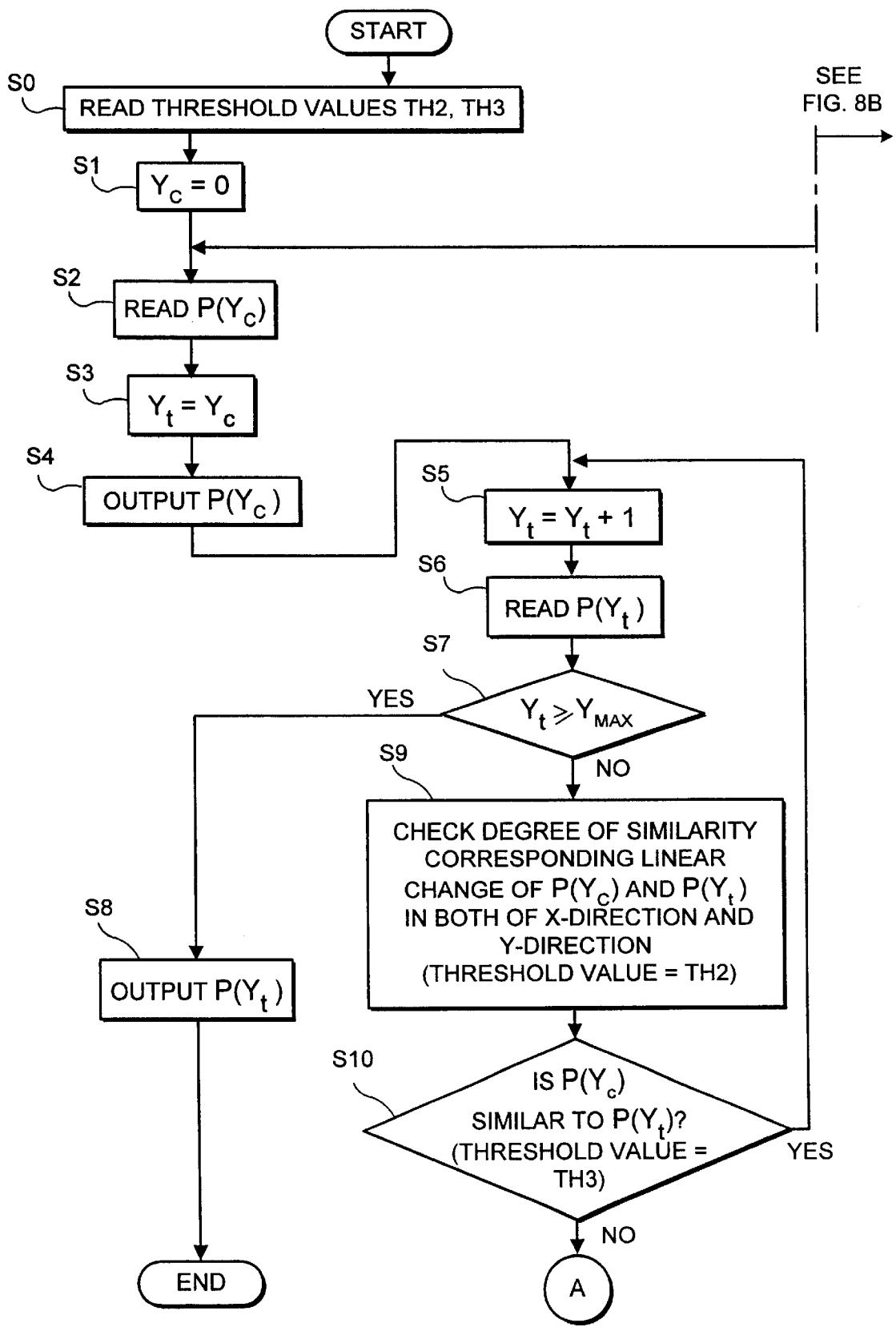
F I G. 8A

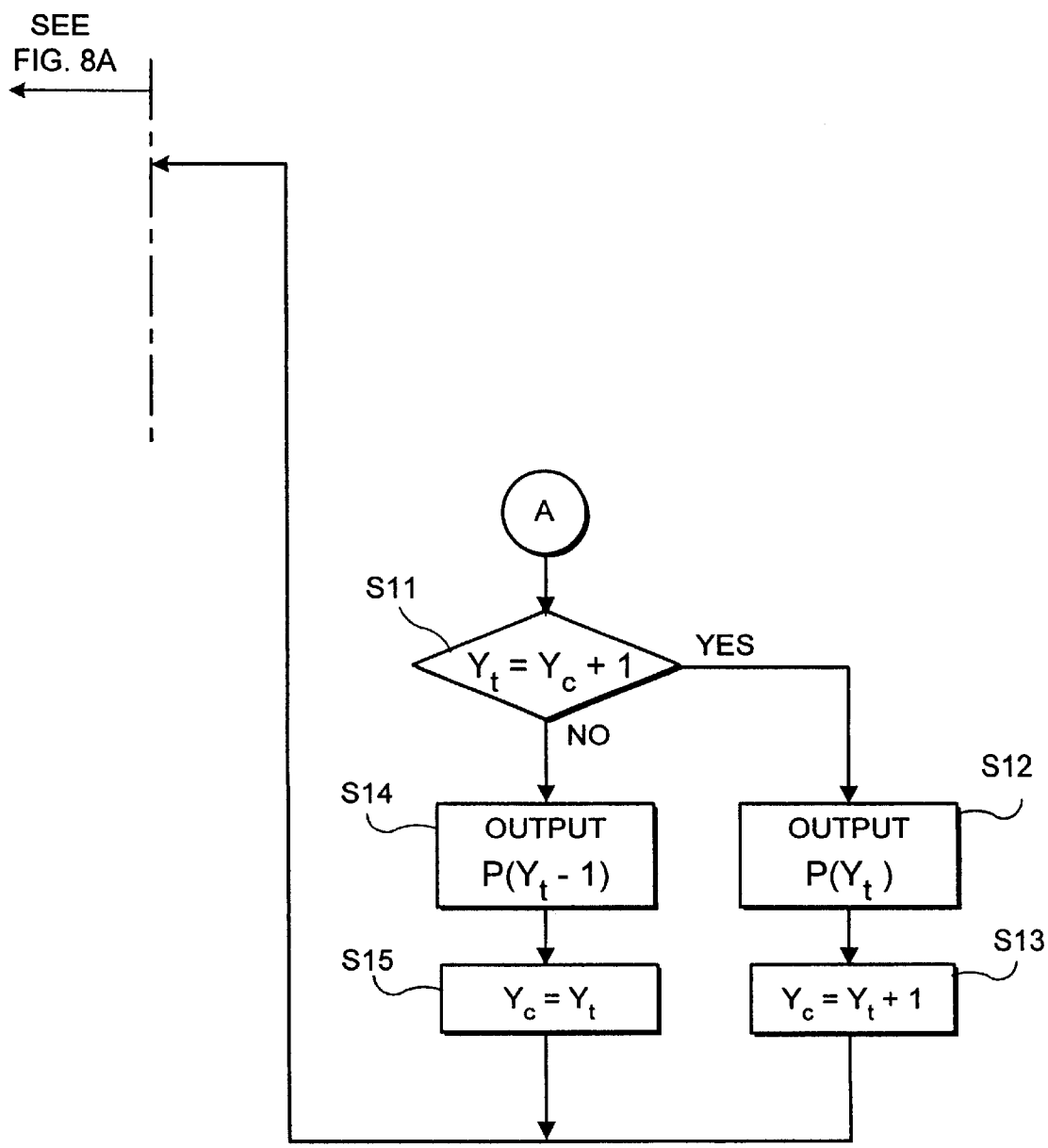
F I G. 8B

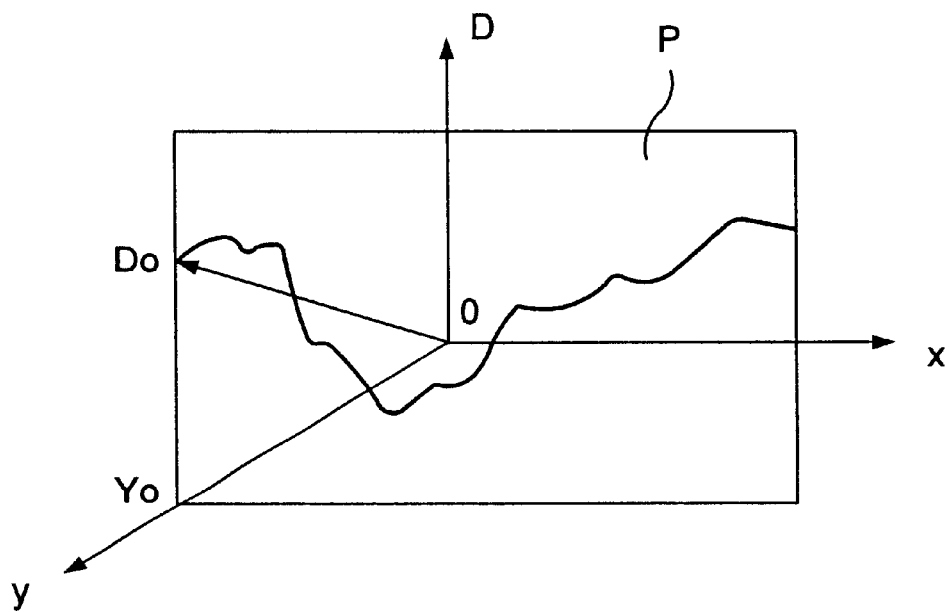
F I G. 9
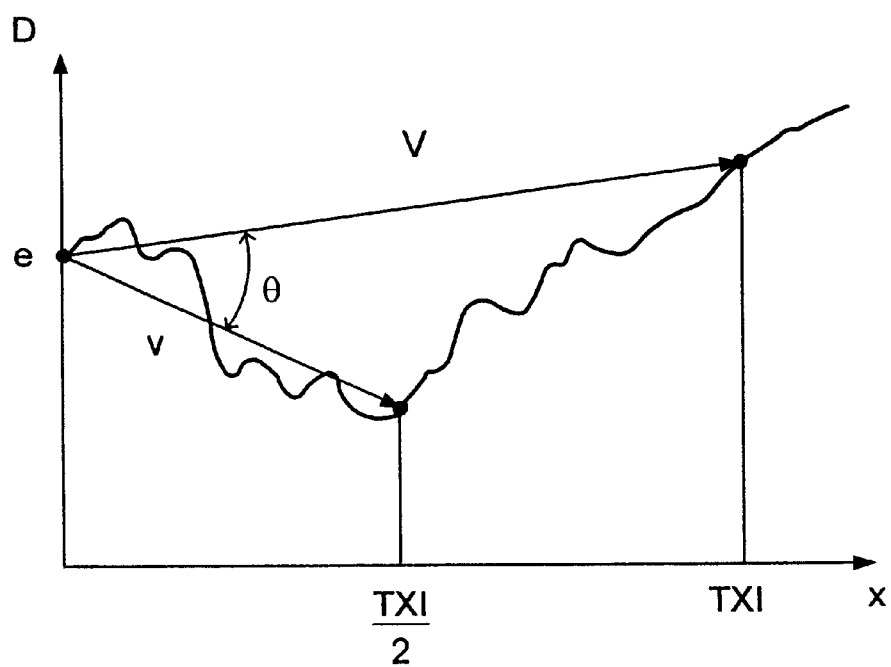
F I G. 10

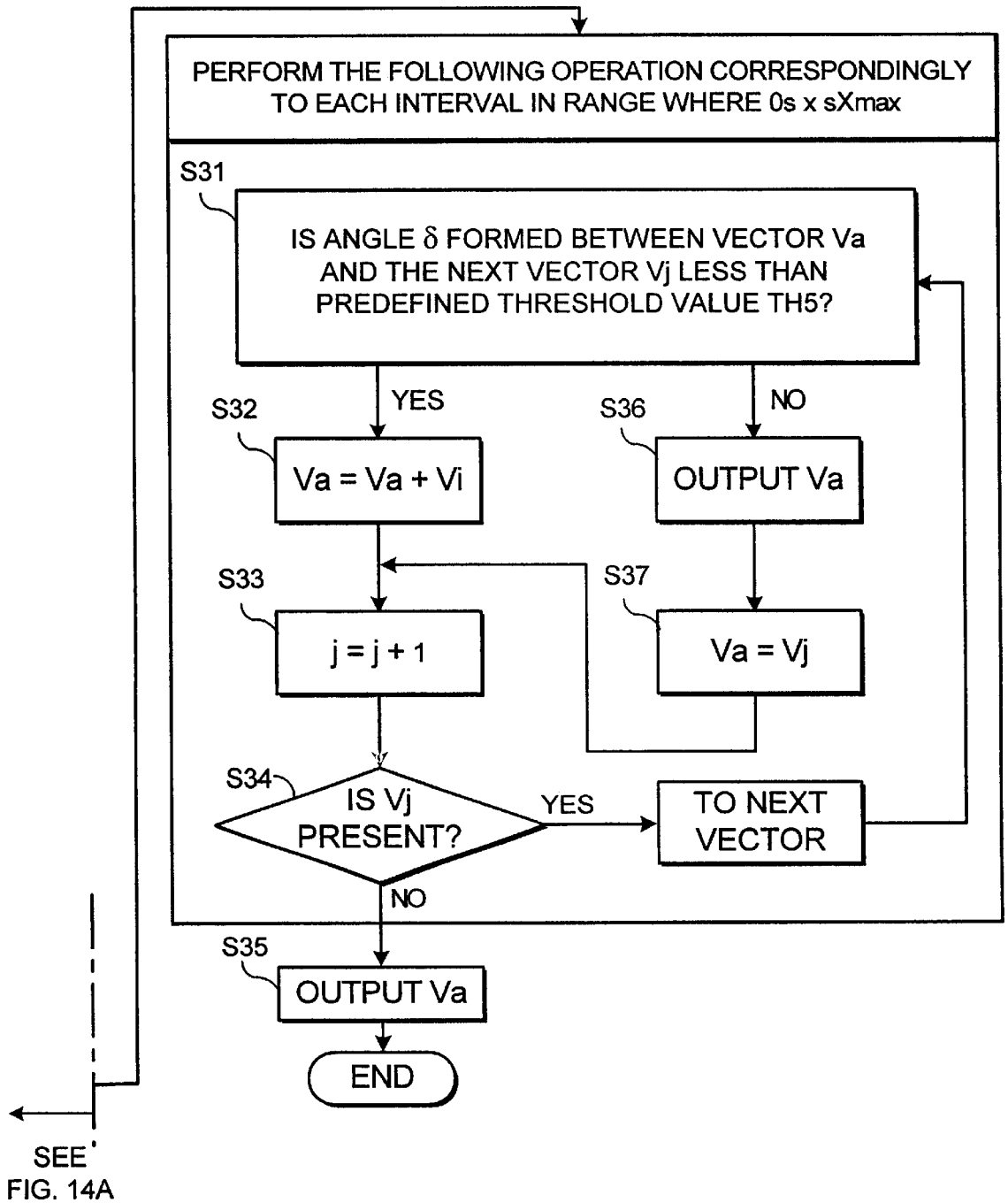
F I G. 14B

| | THE NUMBER OF ALL X-D PLANES | |
|---|---|---|
| HEADER PORTION (1a) | X max. | |
| | Y max. | |
| | | |
| DATA PORTION (1b) | FIRST X-D PLANE | THE NUMBER OF VECTORS ON THE PLANE | |
| | | OFFSET VECTOR | $Y_0, D_0$ |
| | | FIRST VECTOR | $X_1, D_1$ |
| | | SECOND VECTOR | $X_2, D_2$ |
| | | ┆ | ┆ |
| | SECOND X-D PLANE | THE NUMBER OF VECTORS ON THE PLANE | |
| | | ┆ | ┆ |
| | | | |

F I G. 15

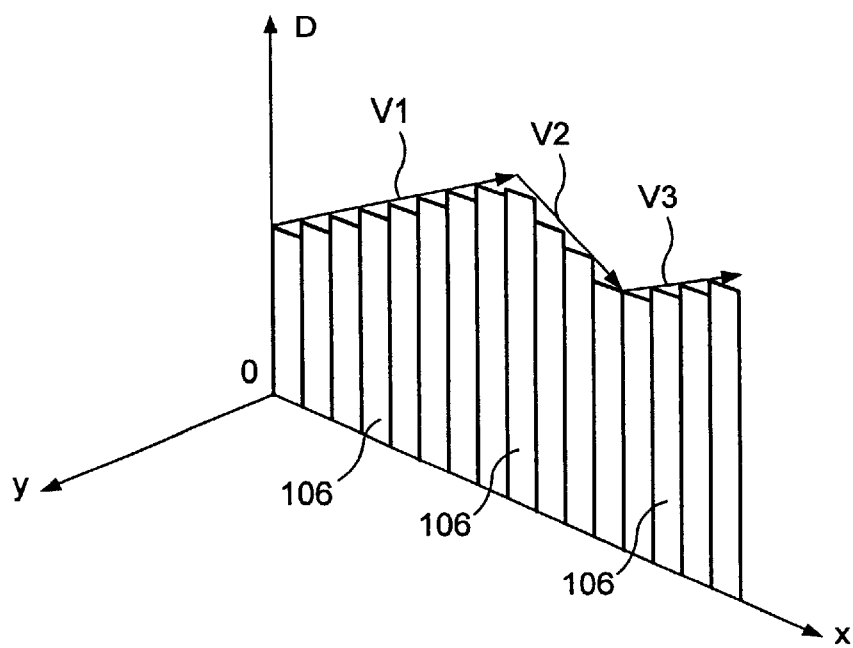
F I G. 16
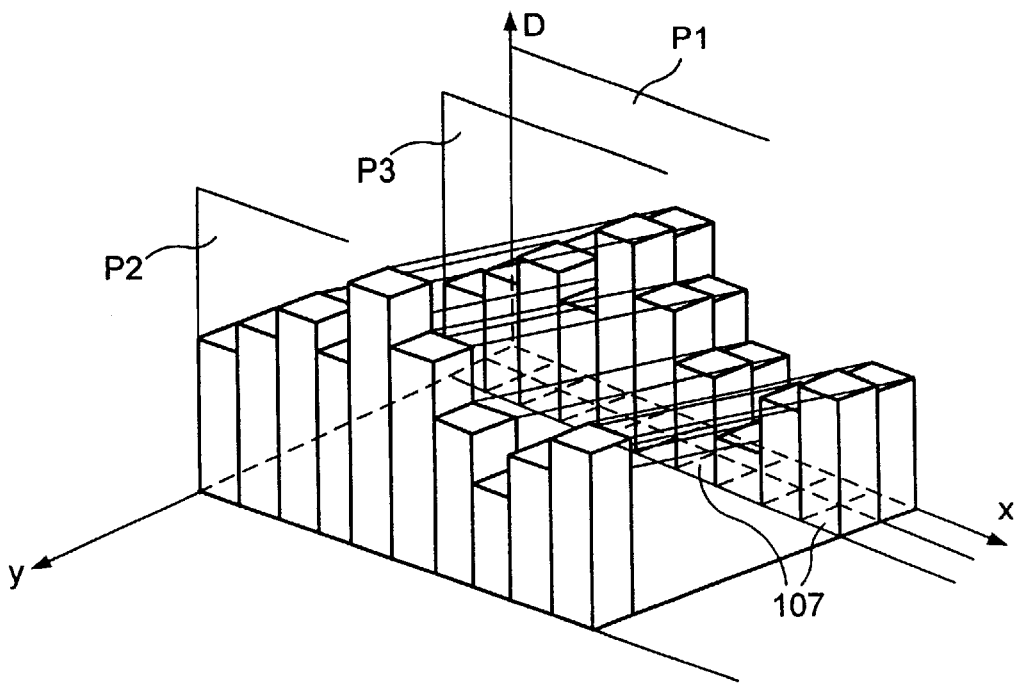
F I G. 17

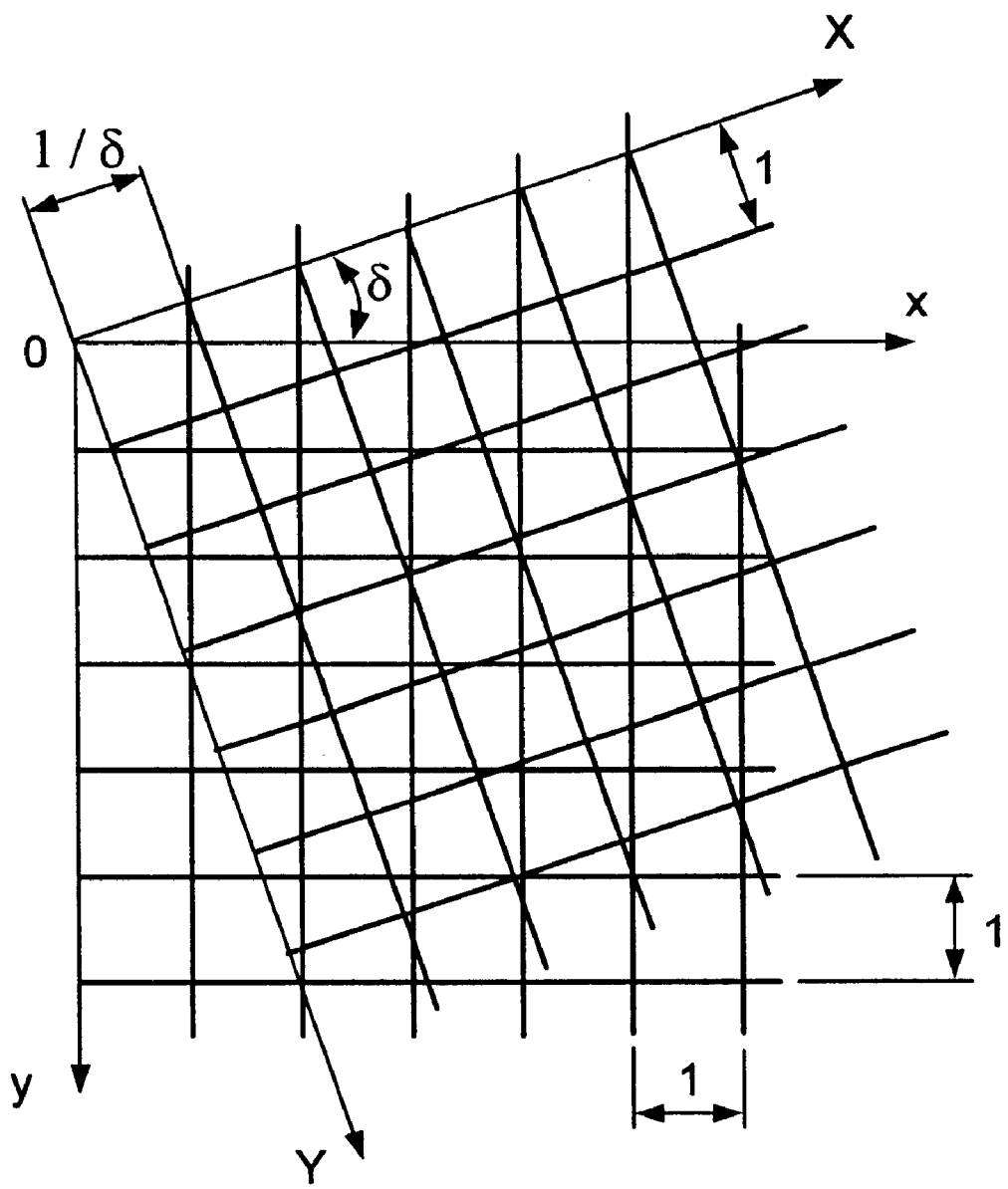
F I G. 18

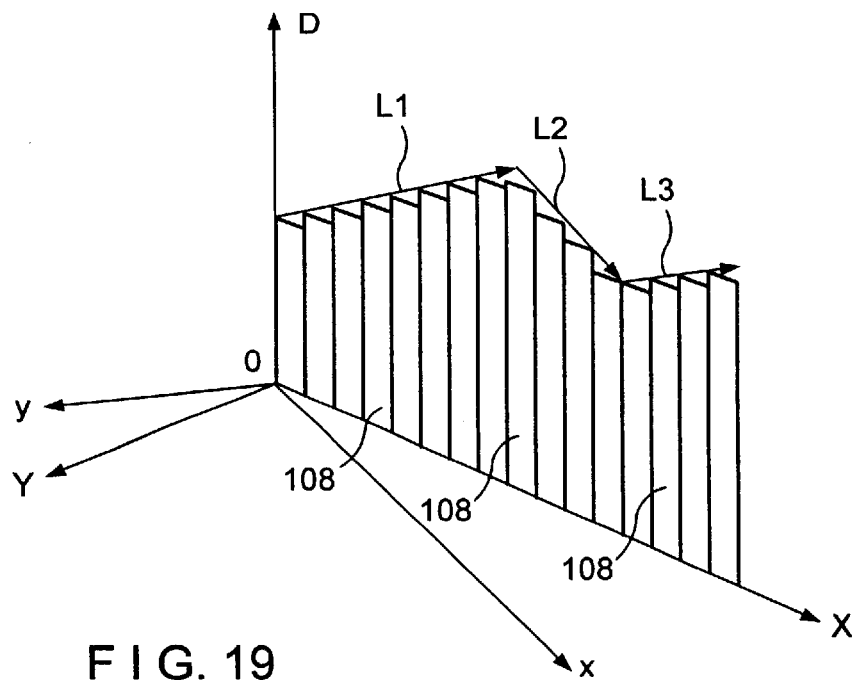
F I G. 19
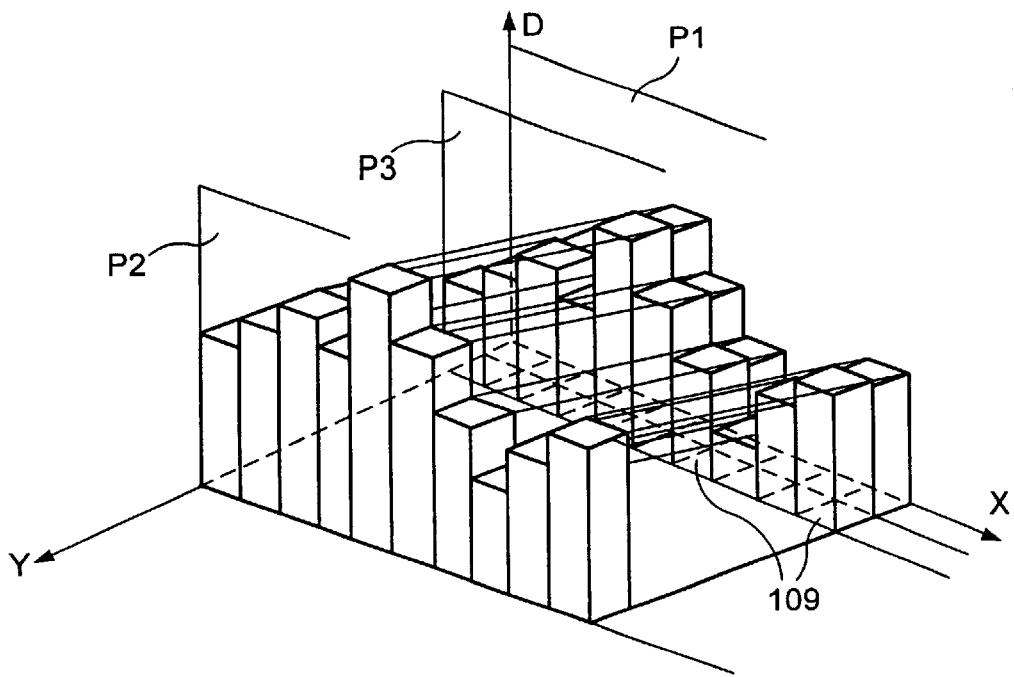
F I G. 20

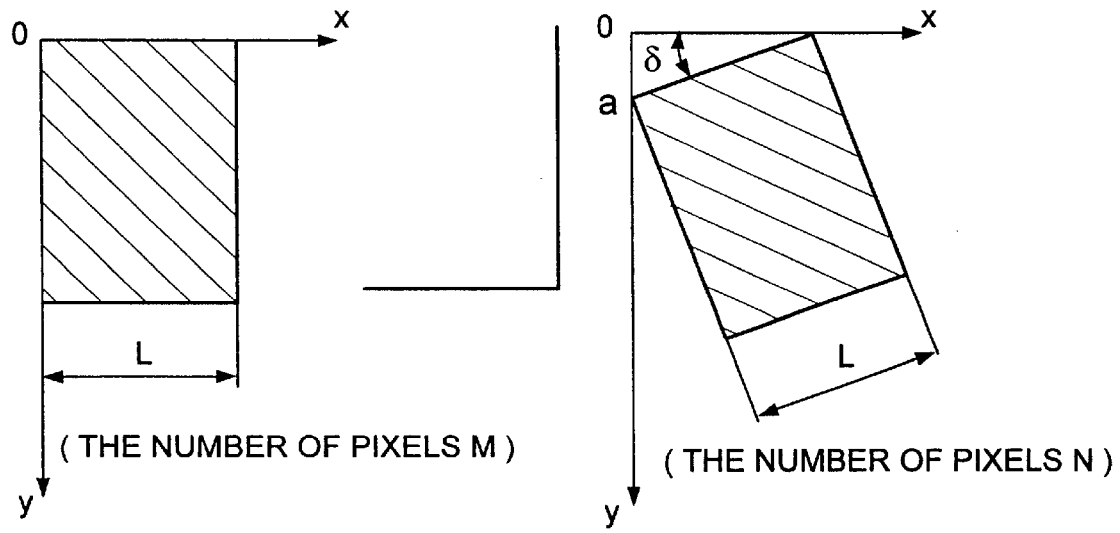
F I G. 21A    F I G. 21B
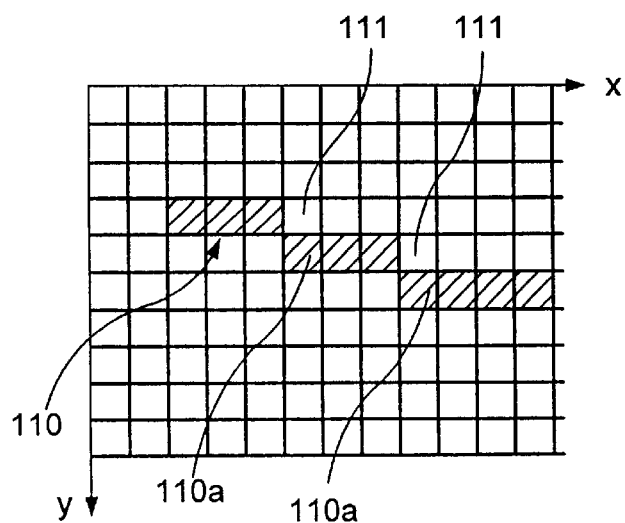
F I G. 22

IMAGE CONVERSION BASED ON EDGES

BACKGROUND OF THE INVENTION

1. Field of the Invention

This invention relates to an image (or picture) processing method for processing a grayscale image (or picture), by which grayscale images of color or monochrome photographs, characters and so on are processed by being converted into digital signals.

Further the present invention relates to an image processing method by which the data amount of image signals are compressed.

Still further the present invention relates to a method for restoring grayscale image from compressed signal data.

2. Description of the Related Art

Hitherto, according to such a kind of a conventional image processing method for processing a grayscale image, an image is divided into fine (or minute) pixels (or pels). Then, a signal representing the density (or gray level) of an image of each of the pixels is converted into a multi-value (or multi-valued) digital signal representing multi-value data. Further, in accordance with such a conventional image processing system, the storage (or save), transfer and reproduction of the converted data (namely, the data obtained by the conversion) are performed without changing the data format thereof.

In accordance with the conventional image processing system for processing grayscale image, an image signal converted correspondingly to each pixel as a multi-value signal representing multi-value data has been processed without changing the data format thereof. Thus, in the case of employing the conventional image processing system, massive amounts of data should be processed. Consequently, the conventional image processing method has drawbacks in that a mass storage device (or a large scale memory device) is necessary to store a great quantity of data and that extremely long time is required when image signals are transferred by, for example, data communication.

Moreover, the conventional image processing method has poor ability to process an image at the time of reproduction thereof. In accordance with the conventional image processing method, when enlarging an image, an operation of filling surplus space with fillers (namely, pad (or padding) data) is performed. In contrast, when shrinking (or condensing) the image, an operation of thinning out pixels is performed. This results not only in degradation in the picture quality but also in great difficulty in scaling (namely, enlargement/shrinkage) of the image at (or by) an arbitrary scaling factor (for example 1.5 times).

Furthermore, the image density of an image is determined by the number of pixels and thus cannot be freely changed. Thus, in the case of employing the conventional image processing method, only a signal generated correspondingly to each pixel in the same way can be inputted to a reproducing device, which is required to reproduce a high quality image, and another reproducing device adapted to simply and easily reproduce an image with low picture quality. Consequently, the conventional image processing method is extremely insufficient. Further, the picture quality of the reproduced image is not higher than the picture quality preset correspondingly to each pixel. Therefore, for instance, when using a reproducing device adapted to be able to reproduce a high quality image for printing, no high quality reproduced images, which should be obtained by such a reproducing device, cannot be obtained.

SUMMARY OF THE INVENTION

Accordingly, an object of this invention is to provide an image processing method for processing a grayscale image, by which the drawbacks of such a conventional image processing method can be eliminated and the compression of data can be easily achieved and the reproduction of a high quality image of highly processability and adaptability to the reproduction condition can be attained at the time of image reproduction by using an image reproducing device having various resolutions.

Further the present invention provide an image processing method in which only the signals of the pixels at the positions where the degree of the density variation of the grayscale images sharply change are extracted and data at the intermediate position is cut off.

To achieve the foregoing object, in accordance with the present invention, there is provided an image processing method for processing a grayscale image, which comprises the steps of: dividing a grayscale image into fine pixels and then receiving input image signals obtained by converting the densities of the pixels into multi-value digital signals, respectively; regarding pixels, at each of which the degree of variation in density abruptly changes, as characterizing the image, and selecting signals corresponding to such pixels from the image signals and taking out (or extracting) the selected signals to thereby compress a quantity of data; restoring the pixels at the time of reproduction of the image by changing the densities of pixels between each pair of adjoining two of the selected points (or pixels) uniformly (or at an average rate); and outputting signals respectively representing the restored pixels.

Further the device according to the present invention has means for extracting a relation of x-D by setting y constant, comparison means for comparing the change in variation degree of the density (D) with a predefined threshold means for representing by a vector an average relation between x and D in each of a sequence of intervals in which the change in the degree is less than the predefined threshold.

Further the image processing method according to the present invention comprises the steps of dividing a grayscale image on an x-y plane into fine pixels and then receiving input image signals obtained by converting densities of said pixels into multi-value digital signals, respectively;

extracting a relation between an x-coordinate and a density by setting a y-coordinate as being constant;

comparing a change in a degree of variation in a density for x-coordinates with a predefined threshold;

obtaining and representing an average relation between the x-coordinate and the density (D) in each of a sequence of intervals, in which the change in the degree is less than the predefined threshold, by a vector; and outputting a vector represented signal.

Still further according to the present invention, the compressed data signal retaining only the signal of pixels at the positions where the degree of density variation in the grayscale images abruptly changes is inputted, the densities of adjacent two of the pixels in the compressed data signal are extracted, and the image signals representing pixels are restored by providing densities which change at an average rate in the range between each pair of adjoining two of the pixels to pixels in the range therebetween to restore signals.

FIG. 1 illustrates an apparatus for performing the aforementioned image processing method of the present invention. This apparatus comprises: image signal input means for inputting image signal respectively corresponding to pixels;

data compression means for performing data compression by selecting and taking out only image signals respectively representing pixels, at each of which the degree of variation in density abruptly changes, from the inputted signals; image restoring means for changing the densities of pixels between each pair of adjoining two of the selected pixels at an average rate; and restored-signal outputting means for outputting signals respectively representing the restored pixels.

FIG. 1 also shows the image restoring apparatus comprising means for inputting compressed data signal retaining only the signals of pixels at the positions where the degree of variation of densities abruptly changes, means for extracting the densities at the adjacent two points in the compressed data signals, and means for restoring signals and representing the pixels, and means for outputting the restored signals.

Thus, in the case of the image processing method of the present invention, only image signals respectively representing pixels at places, at each of which the degree of variation in density abruptly changes, are selected from and taken out of multi-value image signals respectively representing pixels. Thus, signals respectively corresponding to pixels in each portion, in which the density changes uniformly, are discarded. Consequently, the quantity of data to be used is reduced (accordingly, such data is compressed). Further, when restoring a grayscale image, pixels positioned between two points (or pixels) respectively located at each pair of adjacent two of selected places are restored by setting the density of each of the pixels positioned therebetween in such a manner as to change at an average rate. Thus, the grayscale image is restored.

Further according to the present invention, the x-D relation is represented by a vector for a unit area of x-D plane, and the degree of variation of the density (D) is represented by a vector in a sequence of intervals in which the change in the degree is less than a predefined threshold, and the signal represented by the vector is outputted.

Further according to the present invention, the pixels between two adjacent points in the compressed data are restored by giving a density signal which changes in average.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIG. 1 is a block diagram showing an image processing apparatus for performing an image processing method of processing a grayscale image according to the present invention;

FIG. 3 is a circuit diagram partially illustrating the configuration of a logic (or logical) circuit;

FIGS. 4 and 5 are perspective diagrams three-dimensionally illustrating an image before edge enhancement and smoothing are performed thereon, and the image after the edge enhancement and smoothing are performed, respectively;

FIGS. 6 and 7 are diagrams schematically illustrating data compression in the y-direction;

FIG. 8 is a flowchart illustrating an operation to be performed in a y-direction data compression circuit;

FIGS. 9 to 13 are diagram schematically illustrating an outline of data compression by utilizing vectorization;

FIG. 15 is a diagram illustrating an outline of a data storage format used in an external storage (or memory) device;

FIGS. 16 to 20 are diagrams schematically illustrating an outline of pixel restoration;

FIGS. 21(A), 21(B) and 22 are diagrams schematically illustrating an outline of pixel restoration to be performed in a final coordinate determination circuit;

DETAILED DESCRIPTION OF THE PREFERRED EMBODIMENT

Hereinafter, the preferred embodiment of the present invention will be described in detail by referring to the accompanying drawings.

Figure 2B:
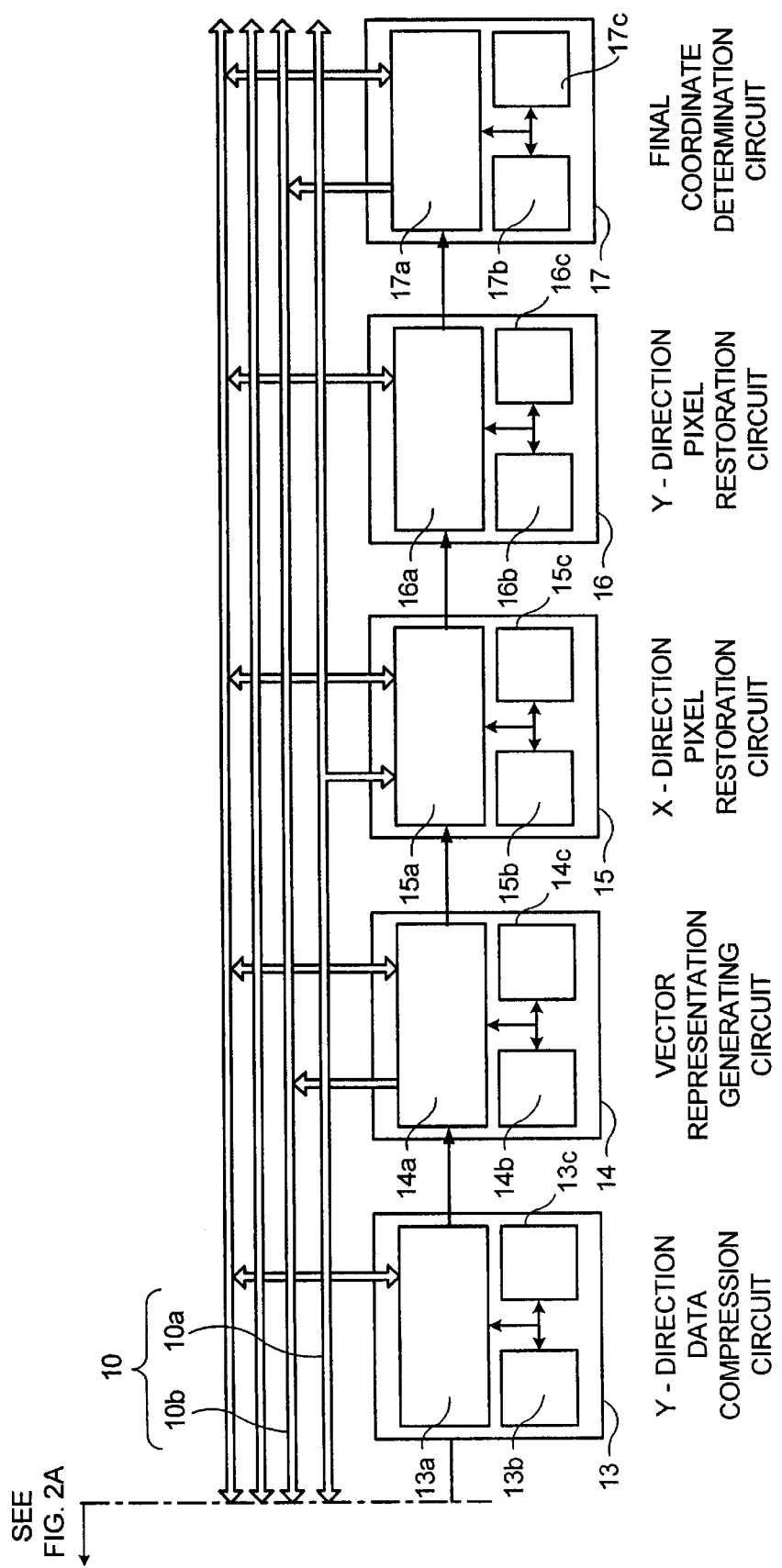
FIG. 2 is a block diagram showing an image processing apparatus for performing an image processing method embodying the present invention, namely, an embodiment of the present invention.

FIG. 2 illustrates an image processing apparatus for performing an image processing method embodying the present invention, namely, an embodiment of the present invention.

In this figure, reference numeral 1 designates an external storage device. Image signals, which are obtained by dividing an image on an x-y plane into fine pixels and then converting the brightness (or density) of each of the pixels into a multi-value (for example, 256-value) digital signal, and threshold values to be used for judgment at the time of performing a data compression are stored in this storage device 1. Reference numeral 2 denotes an input/output interface for inputting signals from and outputting signals to external apparatuses. The external storage device 1 is connected to input and output terminals of the input/output interface 2. Additionally, a monitor 5 and a printer 6 are connected to an output terminal of the input/output interface 2 through drive circuits 3 and 4, respectively.

Reference numeral 7 designates a bus control circuit which is connected to a system control bus 8, an address bus 9 and data buses 10 in the apparatus and which is operative to control operations of these buses 8, 9 and 10. Incidentally, the data buses 10 include a forward direction data bus 10a and a backward direction data bus 10b, which are provided independent of each other in the apparatus. Thus, a high-speed data transmission is realized. Reference numeral 11 denotes a system control circuit that is operative to transfer data in the apparatus and give data to and receive data from external devices through a system control bus 8. This system control circuit 11 is a microcomputer consisting of an input/output interface 11a, a CPU 11b and a memory 11c, and operates in accordance with software stored in the memory 11c.

Reference numeral 12 denotes an edge-enhancement/smoothing circuit which is connected to the forward direction data bus 10a and which is operative to sequentially read image signals and to perform an edge enhancement operation and a smoothing operation on noise components. A publicly known circuit may be used as this circuit. Reference numerals 12a, 12b and 12c denote an input/output control portion, an operation processing portion and a buffer, respectively. Incidentally, the edge-enhancement/smoothing circuit 12 may be omitted.

Reference numeral 13 designates a y-direction data compression circuit which is connected to an output terminal of the edge-enhancement/smoothing circuit 12 and is operative to reduce a quantity of data in the y-direction (namely, perform y-direction data compression); and 14 a vector representation generating circuit which is connected to an output terminal of the y-direction data compression circuit 13 and is operative to generate a vector representation corresponding to an image signal to thereby reduce a quantity of data in the x-direction (namely, perform x-direction data compression). An output terminal of the vector representation generating circuit 14 is connected to the backward direction data bus 10b. Reference characters 13a, 13b and 13c denote an input/output control portion, an operation processing portion and a buffer of the y-direction data compression circuit 13, respectively. Reference characters 14a, 14b and 14c denote an input/output control portion, an operation processing portion and a buffer of the vector representation generating circuit 14, respectively.

Each of the aforementioned circuits 12, 13 and 14 is connected to the system control bus 8. Each of the operation processing portions 12b, 13b and 14b is a logic circuit constituted by combining and connecting a large number of AND gates, OR gates and NOT gates with one another in such a manner as to perform a predetermined operation. When data is inputted to such a circuit, a predetermined operation is performed in accordance with the configuration of the circuit. Then, a result of the operation is outputted from the circuit. FIG. 3 shows a part of such a logic circuit. Reference numeral 101 and 102 designate NOT gate and NAND gate, respectively. Each of these operation processing portions 12b, 13b and 14b may be constituted by a CPU (or microprocessor). Moreover, such a CPU (or microprocessor) may be controlled by software. Incidentally, in such a case, the operation speed is considerably reduced.

In FIG. 2, reference numerals 15 and 16 denote pixel restoration circuits for converting vector representations, which are generated from image signals, into multi-value signals respectively corresponding to pixels. More particularly, reference numeral 15 designates an x-direction pixel restoration circuit for restoring pixels aligned along the x-direction; and 16 a y-direction pixel restoration circuit for restoring pixels aligned along the y-direction. Further, reference numeral 17 designates a final coordinate determination circuit for performing the determination of final coordinates in the case of finally reproducing an image. These circuits 15, 16 and 17 are connected to the system control bus 8. An input terminal of the x-direction pixel restoration circuit 15 is connected to the forward-direction data bus 10a. An output terminal of the final coordinate determination circuit 17 is connected to the backward-direction data bus 10b.

Reference characters 15a, 16a and 17a designate input/output control portions of the circuits 15, 16 and 17, respectively. Reference characters 15b, 16b and 17b denote operation processing portions of the circuits 15, 16 and 17, respectively. Reference characters 15c, 16c and 17c denote buffering portions of the circuits 15, 16 and 17, respectively. Each of the operation processing portions 15b, 16b and 17b is a logic circuit constituted by combining and connecting a large number of AND gates, OR gates and NOT gates with one another in such a manner as to perform a predetermined operation. Each of these operation processing portions 15b, 16b and 17b may be constituted by a CPU (or microprocessor). Moreover, such a CPU (or microprocessor) may be controlled by software. Incidentally, in such a case, the operation speed is considerably reduced.

Next, an operation of the apparatus for performing the aforementioned method embodying the present invention will be described hereinbelow.

First of all, threshold values, which are used for making a judgment in an image processing operation, and an image signal are transferred from the external storage device 1 to the buffer 12c of the edge-enhancement/smoothing circuit 12 through the input/output interface 2. This image signal is obtained by dividing an image on an x-y plane into fine pixels and converting the brightness or density (D) of each of the pixels into a multi-value digital signal. This transfer is performed under the control of the system control circuit 11. First, for instance, data of rows respectively corresponding to five y-coordinates are transferred to the buffer 12c of the edge-enhancement/smoothing circuit. Then, each time when the data of one row is outputted therefrom to the y-direction data compression circuit 13, new data is inputted thereto from the external storage device 1.

A publicly known circuit may be used as this edge-enhancement/smoothing circuit 12. Thus, the detailed description of the circuit 12 is omitted herein. FIGS. 4 and 5 illustrate an image represented by an image signal by means of three-dimensional coordinates before edge enhancement and smoothing are performed thereon, and the image by means of three-dimensional coordinates after the edge enhancement and smoothing are performed, respectively. Namely, the coordinate D represents the density of each pixel. Input image signal illustrated in FIG. 4 is changed into an image signal on which the edge enhancement and the smoothing of noise components have been performed as shown in FIG. 5. Then, this image signal is outputted to the y-direction data compression circuit 13 correspondingly to each of the y-coordinates, namely, each x-D plane.

Next, the processing to be performed in the y-direction data compression circuit 13 will be described hereunder.

In this circuit, data on the x-D plane corresponding to a y-coordinate are compared with each other. Then, only data at both ends of each of a series of ranges, in which data are similar to each other, in the y-direction on the x-D plane are outputted to the next x-direction data compression circuit 14. Further, data provided therebetween on the x-D plane are discarded. Thus, a y-direction data compression is performed.

This data compression will be described hereinbelow by referring to FIGS. 6 and 7.

In FIG. 6, reference character Yc denotes the y-coordinate of an x-D plane which is a reference for the comparison; Yt the y-coordinate of an x-D plane to be compared; P(Yc) data on the x-D plane at the y-coordinate =Yc; and P(Yt) data on the x-D plane at the y-coordinate =Yt.

Further, it is judged whether or not P(Yt) is similar to this P(Tc). This judgment is performed by checking the degree of similarity between the linear changes in both of the x-direction and the y-direction of P(Yc) and P(Yt) (incidentally, the degree of similarity between data is defined as that of possibility of sufficient restoration of one of the data from the other thereof by utilizing linear interpolation performed by pixel restoration circuits 15 and 16 (to be described later)).

Namely, it is judged that "P(Yc) is similar to P(Yt)", in the case that P(Yc) is employed as a reference and the following condition represented by mathematical expressions is satisfied:

$$\left|\left(\max_{1\leq i\leq n} c \frac{\partial D}{\partial y}\bigg|x=p_i\right) - \left(\min_{1\leq i\leq n} c \frac{\partial D}{\partial y}\bigg|x=p_i\right)\right| < TH3$$

when obtaining $$c \frac{\partial x}{\partial D}\bigg| x = pi (i=1, 2, \ldots n)$$

for points (or pixels) Pi (namely, P1, P2, . . . , Pn) at each of which the following inequality is met in an interval $0 \leq x \leq Xmax$:

$$\left|a\frac{\partial D}{\partial x} + b\frac{\partial D}{\partial y}\right| > TH2.$$

Incidentally, in the aforementioned expressions, the characters a, b and c denote coefficients; and TH2 and TH3 designate threshold values read from the external storage device 1.

Further, for instance, in the case that P(0) is similar to each of P(1), P(2) and P(3), that P(0) is not similar to P(4), that each of P(5), P(6), P(7) and P(8) is similar to P(4) and that P(9) is not similar to P(4), even when the density uniformly changes at average rates between P(0) and P(3) and between P(4) and P(8), respectively, it appears that there are no differences between an original image and the image having undergone this treatment. Thus, as illustrated in FIG. 7, only data at both ends of a series of ranges in which data are similar to one another, namely, only P(0), P(3), P(4) and P(8) are sequentially outputted to the next vector representation generating circuit 14. Further, data provided therebetween are discarded. Thus, the quantity of data is reduced (namely, the data compression is performed).

FIG. 8 is a flowchart illustrating an operation to be performed in the y-direction data compression circuit 13. The logic circuit of the operation processing portion 13b is configured by perform an operation according to this flowchart. Incidentally, if the operation processing portion is constituted by a CPU (or microprocessor), a program for performing the operation according to this flowchart should be stored in a memory. This goes for the case of other flowcharts which will be described later.

In the flowchart of FIG. 8, reference character "s" is used to indicate steps of this process. First, threshold values are read in step s0. Then, in step s1, the y-coordinate Yc of the x-D plane, which is a reference for the comparison, is set at 0. Subsequently, in step s2, data P(Yc) on the x-D plane is read. Next, in step s3, the y-coordinate Yt of the x-D plane, which is an object to be compared, is set as being equal to Yc (namely, Yt=Yc). Then, in step s4, the data P(Yc) on the x-D plane corresponding to the y-coordinate Yc is outputted to the vector representation generating circuit 14. Subsequently, the y-coordinate Yt is set in such a manner that Yt=Yt+1. Then, the data P(Yt) on the x-D plane is read in step s6. If it is found in step s7 that Yt reaches Ymax., the data P(Yt) is outputted to the vector representation generating circuit 14. Thus, the process is terminated.

If it is found in step s7 that Yt does not reach Ymax., the degree of similarity corresponding to the linear change of each of P(Yc) and P(Yt) in both of the x-direction and the y-direction is determined at a threshold value TH2 in step s9 by using partially differential operators. Then, in step s10, a judgement or decision is performed again for all points, at each of which a result of the partially differential operation is larger than the threshold value TH2 (namely, a deviation is large), at a threshold value TH3 by a partially differential operator with respect to y. Namely, if the difference between the maximum value and the minimum value of the obtained partially differential coefficients is larger than the threshold value TH3, it is decided that P(Yc) is not similar to P(Yt). In contrast, if the difference therebetween is smaller than the threshold value TH3, it is decided that P(Yc) is similar to P(Yt).

Furthermore, if it is decided in step s10 that P(Yc) is similar to P(Yt), the program returns to step s5. In contrast, if it is decided in step s10 that P(Yc) is not similar to P(Yt), it is determined in step s11 whether or not Yt=Yc+1. In the case that Yt=Yc+1, P(Yt) is outputted to the vector representation generating circuit 14. Then, in step s13, Yc is set in such a manner that Yc=Yt+1. Subsequently, the program returns to step s2. Further, if it is found in step s11 that Yt is not equal to (Yc+1), P(Yt-1) is outputted to the vector representation generating circuit in step s14. Then, Yc is set in step s15 in such a way that Yc=Yt. Subsequently, the program returns to step s2.

Next, an operation to be performed by the vector representation generating circuit 14 will be described hereunder.

In this circuit, the change in the degree of variation of the density (D) for the x-coordinates is compared with a predefined threshold (or value) according to the data on each of the x-D planes, which are inputted from the y-direction data compression circuit 13, namely, according to the relation between the x-coordinate and the density (D). Further, only signals representing pixels, at each of which the degree of variation in density abruptly changes, are extracted. In the case of the apparatus for performing the method embodying the present invention, the extracted signals are recognized as representing the starting point and the end (or terminal) point of each vector. Moreover, an average relation between the x-coordinate and the density (D) in each of a sequence of intervals, in which the change in the degree is less than the predefined threshold, is obtained and represented by a vector. Thus, the quantity of data in the x-direction is reduced (namely, the x-direction data compression is performed) by generating the vector representation of the image signal.

This data compression processing is carried out by performing three stages thereof, namely, a wide-area decision stage, a local decision stage and a vector smoothing stage.

First, as shown in FIG. 9, a set (Y0, D0) of the y-coordinate and the D-coordinate of the x-D plane, which is an object to be processed, at the x-coordinate x=0 is represented by a vector (namely, an offset vector) whose starting point is the origin of the x-y-D three-dimensional coordinate system and is outputted to and stored in the external storage device 1.

FIG. 10 schematically illustrates the wide-area decision. The x-coordinates are divided into intervals (or sections), each of which has a predefined wide width (=a threshold value TX1). Further, let θ denote an angle formed between a full-width vector V, which starts from the starting point e, and a half-width vector v. Moreover, if this angle θ is less than a predefined threshold value (TH1), it is decided that the change in the density within the wide-area width is recognized by human eyes as being constant. Thus, the data included in this interval is represented by a full-width vector V whose width is TX1 (incidentally, information on this vector is tentatively stored in the buffer 14c). Thus, the quantity of data in the x-direction is reduced (namely, the x-direction data compression is performed). Further, the apparatus advances to the wide-area decision on the next wide-area interval.

Regarding intervals on which the data compression is not performed at the wide-area decision stage, a local decision is performed on each of the pixels in each of such intervals.

Figure 11:
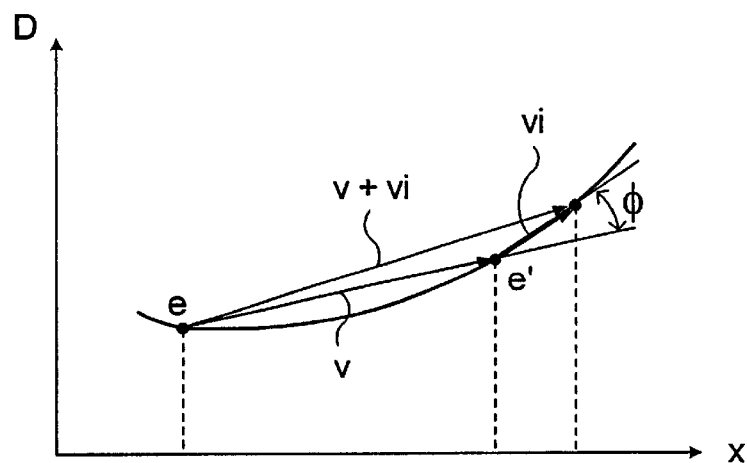

FIG. 11 schematically illustrates the local decision. Further, let φ denote an angle formed between the vector v, which corresponds to each of all of the pixels in such an interval and starts from the starting point e, and another vector vi, which starts from the terminal point of the vector v to the next pixel. If this angle φ is less than a predefined threshold value (TH4), the data included in such an interval is represented by a single composite vector (v+vi) obtained by composing the vectors v and vi (incidentally, information on this composite vector is tentatively stored in the buffer 14c). Thus, the quantity of data is decreased (namely, the data compression is performed). Furthermore, similarly, the local decision is serially performed on the next pixel. In contrast, if the angle φ is larger than the predefined threshold, it is decided that the data included in such an interval cannot be represented by a single vector (v+vi) and that the vector v is employed as a vector representation corresponding to a range between the starting point e and the terminal point e' thereof (incidentally, information on this vector v is tentatively stored in the buffer 14c). Then, the local decision is continued and performed on the subsequent portion of such an interval by employing the terminal point e' of FIG. 11 as a new starting point.

Further, upon completion of the wide-area decision and the local decision on all of the intervals, the vector smoothing is finally performed on the vector representation of the data on the x-D plane. At this stage, it is judged correspondingly to each of all the intervals provided on the x-D plane from the side of x=0 whether or not an angle δ formed between the vector, which corresponds to the interval that is an object of a current judgement, and the next vector, which corresponds to the interval that is the next object thereof, is less than a predefined threshold value (TH5). Further, data included in a sequence of intervals, in which the angle δ is less than the predefined threshold, are represented by a single vector. Therefore, as a result of this processing, data included in a wide range, whose width exceeds the decision width TX1 for the wide-area decision, can be uniformly represented by a vector. Thus, the x-direction data compression is made to be perfect. Then, the resultant data are outputted to the external storage device 1 through the input/output interface 2 and are stored therein. Operations of giving and receiving such data are controlled by the system control circuit 11. Vector data obtained in this way is specified by the x and D-coordinates of the starting point and the terminal point of a corresponding vector. Furthermore, the terminal point of a certain vector is the starting point of the next vector. Furthermore, as above stated, these points are located at the places where the degree of variation of the density abruptly changes.

Figure 12:
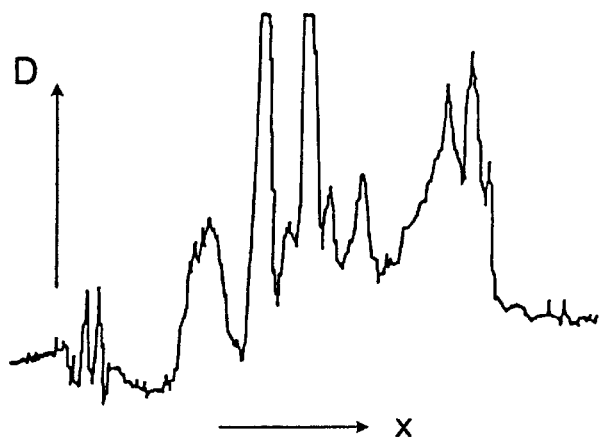
Figure 13:
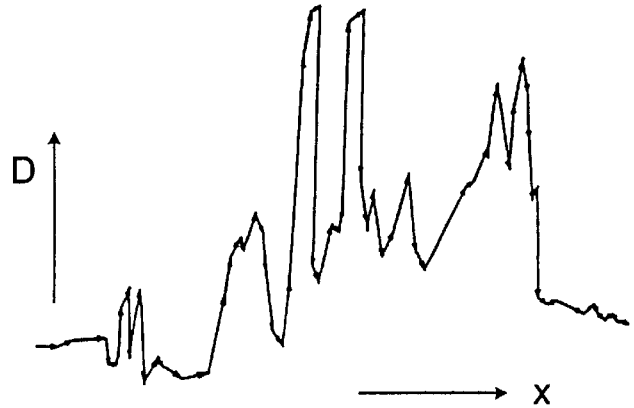

FIGS. 12 and 13 illustrate data on the x-D plane before and after the data compression, respectively. The quantity of data, which are present correspondingly to the number of pixels, respectively, as shown in FIG. 12, is considerably reduced (namely, the data is greatly compressed) by generating the vector representation, as shown in FIG. 13.

The vector representation generating circuit 14 performs such processing on all of data on the x-D planes, which are sent from the y-direction data compression circuit 13.

Figure 14A:
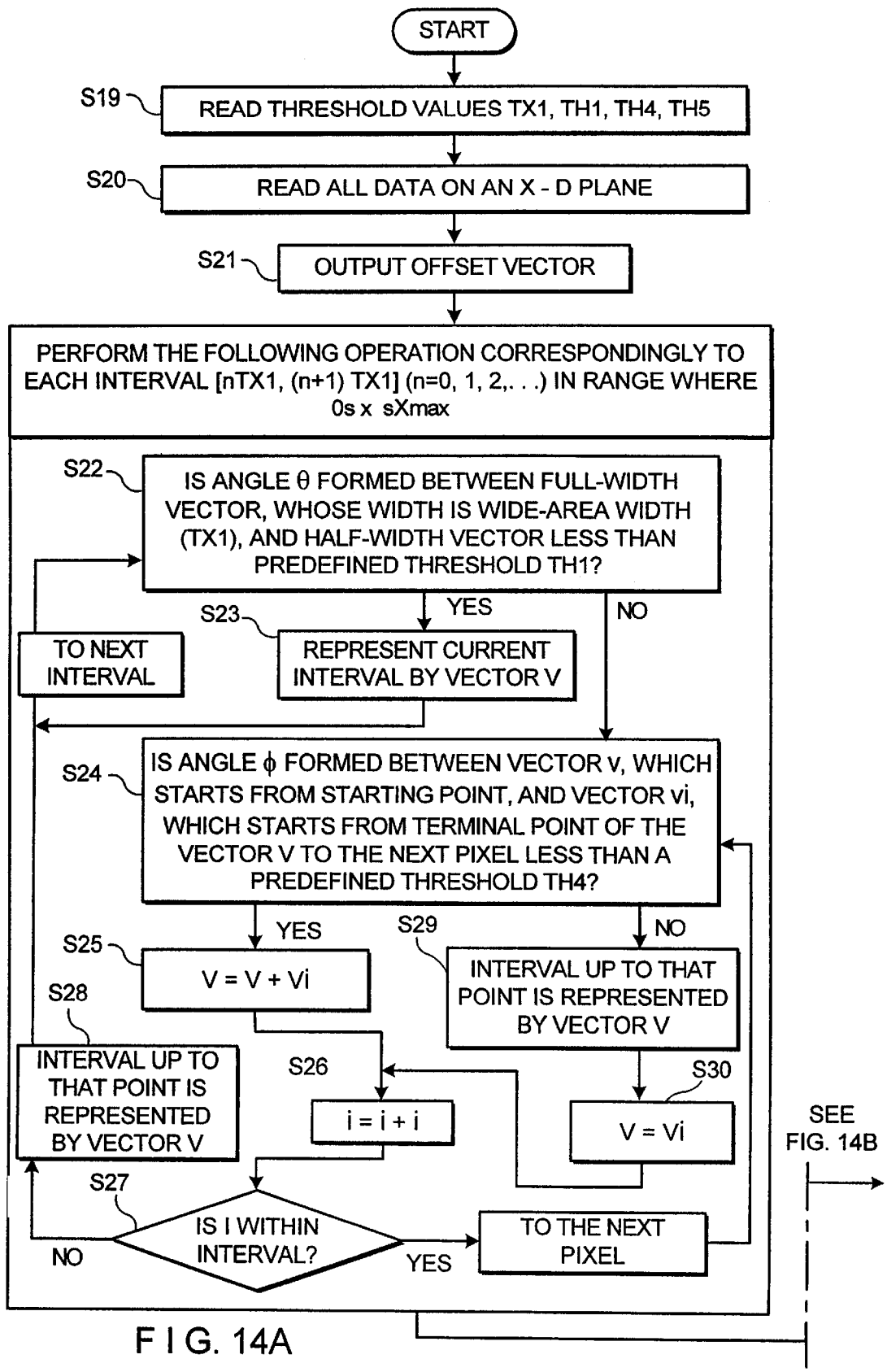
FIG. 14 is a flowchart illustrating an operation to be performed in a vector display (or representation) generating circuit.

FIG. 14 is a flowchart illustrating an operation to be performed in the vector representation generating circuit 14. The logic circuit of the operation processing portion 14b is configured in such a manner as to perform the operation in accordance with this flowchart.

In this circuit, first, threshold values are read in step s19. The, in step s20, all data on an x-D plane are read. Subsequently, data representing an offset vector corresponding to this x-D plane is outputted to the external storage device 1. Thereafter, in step s22, the x-coordinates are serially divided from x=0 to x=Xmax into intervals each of which has a width being equal to a wide-area width, namely, the threshold value TX1. Further, it is decided correspondingly to each of such intervals whether or not the angle θ formed between the full-width vector V, which starts from the starting point e thereof, and the half-width vector v is less than predefined threshold value TH1. Furthermore, if the angle θ is less than the predetermined value, the (current) interval is represented by the full-width vector V in step s23. Then, the apparatus returns to step s22 whereupon such a judgement is made on the next interval.

If it is found in step s22 that the angle θ is not less than the predetermined value, the (current) interval is divided into pixels in step s24. Further, it is decided whether or not the angle φ formed between the vector v, which starts from the starting point, and the next vector vi, which starts from the terminal point of the vector v to the next pixel, is less than a predefined threshold value TH4. Moreover, if the angle φ is less than the predefined value, the vector v is set in step s25 in such a manner that v=v+vi. Then, a parameter i is set in step s26 in such a way that i=i+1. Subsequently, it is decided in step s27 whether or not the parameter i is within this interval. If so, the apparatus returns to step s24 whereupon the decision is performed on the next pixel. In contrast, if not, the interval up to that point is represented in step s28 by the vector v. Then, the apparatus returns to step s22 whereupon the decision is performed on the next wide-area interval.

In contrast, if it is found in step s24 that the φ is not less than the predefined threshold value TH4, the interval up to that point is represented by the vector v in step s29. Then, the vector v is updated in step s30 in such a manner that v=vi. Subsequently, the apparatus advances to step s26.

Thus, upon completion of generating the vector representation of the entire range from x=0 to x=Xmax, it is decided in step s31 whether or not the angle δ formed between the vector Va and the next vector Vj is less than a predefined threshold value TH5 in the entire range from x=0 to x=Xmax. Further, if the angle δ is less than such a predefined value, the vector Va is updated in step s32 in such a way that Va=Va+Vj. Then, the parameter j is updated in step s33 in such a manner that j=j+1. Subsequently, it is decided in step s34 whether or not the vector Vj is present. If this vector is present, the apparatus returns to step s31 whereupon the decision is made on the next vector. Conversely, if the vector Vj is not present, Va is outputted in step s35 to the external storage device 1. Thus, the operation is finished.

In contrast, if it is found in step s31 that the angle δ is not less than the predefined threshold value TH5, information on the vector Va is outputted to the external storage device 1. Then, in step s37, Va is updated in such a way that Va=Vj. Subsequently, the apparatus advances to step s33.

Thus, in this apparatus for performing the image processing method embodying the present invention, the quantity of data is reduced (namely, the data compression is performed) in the y-direction data compression circuit 13 and the vector representation generating circuit 14 according to the magnitudes of the threshold values read from the external storage device 1.

FIG. 15 illustrates an example of a data storage format used in the external storage device 1.

The number of all x-D planes, which are represented by vectors, and the maximum values of the coordinates Xmax and Ymax are stored in a header portion 1a of a storage part thereof. Data corresponding to each of the x-D planes are stored in a data portion 1b. The length (or size) of this data portion 1b varies depending upon the quantity of data compressed by the y-direction data compression circuit 13 and the vector representation generating circuit 14. Moreover, as illustrated in this figure, the number of vectors included in the x-D plane, an offset vector and data representing all of the vectors in the x-D plane are stored therein correspondingly to each of the x-D planes. In the case of this apparatus for performing the method embodying the present invention, the coordinates (x, D) of the terminal point of each of the vectors are stored at a location corresponding to the address thereof. Incidentally, the coordinates of the starting point of each of the vectors are those of the terminal point of the immediately preceding vector.

Thus, in the case of image data which is represented by vectors obtained from data representing each of the pixels, the quantity of the image data can be greatly reduced (namely, the image data can be considerably compressed). Needless to say, the size of the storage device can be reduced. Furthermore, a communication time can be greatly decreased when performing data transfer.

Next, operations of the x-direction pixel restoration circuit 15 and the y-direction pixel restoration circuit 16 will be described hereinbelow. In these circuits, data compressed and stored in the external storage device 1 in the format illustrated in FIG. 15 is converted into multi-value signals which respectively correspond to pixels and are necessary for reproducing an image. Such a conversion is to extract the densities of two points (or pixels) which are positioned at adjacent places, from the data which are not discarded, and to restore the pixels by giving the density, which changes at an average rate, to points in the range between the two adjacent points.

First of all, data represented by vectors are transferred from the external storage device 1 to the buffer 15c of the x-direction pixel restoration circuit 15 through the input/output interface 2. This transfer of the data is performed under the control of the system control circuit 11. First, for example, data respectively corresponding to five x-D planes are transferred to the x-direction pixel restoration circuit 15. Each time when the data corresponding to one of the x-D planes are outputted therefrom to the y-direction pixel restoration circuit 16, data corresponding to the next x-D plane is newly inputted from the external storage device 1 to the x-direction pixel restoration circuit 15.

FIGS. 16 and 17 schematically illustrate how the restoration of pixels is carried out without performing the enlargement, shrinkage and rotation of an image.

First, in the x-direction pixel restoration circuit 15, the density (D) determined by vectors V1, V2, . . . is given to each of the pixels 106 correspondingly to each of the x-D planes, as illustrated in FIG. 16. Namely, the brightness at both ends of each of the vectors are given to the pixels positioned thereat, respectively. The brightness (D) corresponding to the heights of points on a line segment representing each of the vectors V1, V2, . . . are sequentially given to the pixels respectively corresponding to the points on the middle portion of each of the vectors. Thus, the density (D) is given to each of the pixels in the x-direction of a portion, the corresponding data of which is discarded when generating the vector representation.

Signals outputted from the x-direction pixel restoration circuit 15 are stored in the buffer 16c of the y-direction pixel restoration circuit 16, correspondingly to each of the x-D planes. In this case, when the data of two x-D planes respectively corresponding to both ends of a sequence of ranges, in which data are similar to each other, in FIG. 7 are stored therein, the y-direction pixel restoration circuit 16 starts performing an operation. The points, whose D-coordinates are the heights D corresponding to the x-coordinates, are connected by a straight line between these planes P1 and P2 as illustrated in FIG. 17. Furthermore, the densities (D) corresponding to the heights of points, which have a certain y-coordinate, on the straight lines are serially given to corresponding ones of the pixels 107 which are placed under the straight lines and have the same y-coordinate as of the corresponding points, respectively. Thus, a new plane P3 is produced between both of the planes P1 and P2. Further, information on the new plane is outputted to the final coordinate determination circuit 17. Such a process is repeated for all of the y-coordinates between the planes P1 and P2. Consequently, the data on the x-D planes, which are discarded by the y-direction data compression circuit 13, are restored by the pixels to each of which the density changing at an average rate in the y-direction correspondingly to each of the x-coordinates is given.

Further, the data corresponding to the x-D planes, the restoration of the pixels on which has been finished, are outputted in sequence to the external storage device 1 through the input/output interface 2. In the case that the enlargement, shrinkage and rotation of the image are not performed, the final coordinate determination circuit 17 outputs input data without changing the input data. Incidentally, the image may be reproduced by directly outputting the outputs of the circuit 17 to the monitor 5 or the printer 6.

Next, an operation of the apparatus in the case, in which the enlargement, shrinkage or rotation of the image is performed at the time of reproduction of the image, will be described hereinafter.

First, data representing the magnification (or enlargement ratio) Mx in the x-direction, the magnification My in the y-direction, and the angle of rotation σ are inputted by an input device (not shown) to the apparatus and are then stored in the external storage device 1. Further, such data are read to the x-direction pixel restoration circuit 15 through the input/output interface 2.

FIGS. 18 to 20 schematically illustrate how the restoration of pixels is carried out by performing the rotation and enlargement or shrinkage of an image. First, on the assumption that an image is rotated by an angle σ with respect to the x-y coordinate system, a new coordinate system X-Y, whose one graduation (or division) only of the scale along the X-axis is multiplied by (1/cos σ), is prepared in the x-direction pixel restoration circuit 15 in such a way that, after the rotation, each pixel corresponds to or is matched with one graduation thereof.

Furthermore, densities, which are determined by the line segments L1, L2, L3, . . . derived from the vectors V1, V2, V3, . . . on the input x-D plane by performing the enlargement, shrinkage or rotation as illustrated in FIG. 19, are given to the pixels 108 on an X-coordinate, correspondingly to each of X-D planes. Namely, the density D of each of the pixels to be restored is computed according to the following equation:

$$D = D_0 + \frac{\Delta x \cdot n \cdot (D_1 - D_0)}{N + \Delta n} \tag{1}$$

where D0 represents the density at the starting point of the vector; D1 represents the density at the terminal point of the vector; n designates the order, which is assigned to a pixel to be processed, from the starting point; N represents the interval between the densities D0 and D1 at the input side; Δn a fraction of an unprocessed part occurring correspondingly to the last pixel in the processing of the immediately preceding vector; and $$\Delta x = \frac{1}{Mx \cdot \cos\sigma}.$$

Thereafter, the restored image undergoes the enlargement or shrinkage in the X-direction, and the obtained image information of one plane in the form, which has been ready for rotation, is outputted to the y-direction pixel restoration circuit 16.

Subsequently, when data of two planes corresponding to both ends of a sequence of ranges, in which data are similar to each other, as illustrated in FIG. 7 are inputted to the buffer 16c of the y-direction pixel restoration circuit 16, the y-direction pixel restoration circuit 16 commences performing the operation. As illustrated in FIG. 20, the densities (D) corresponding to the heights of points, which have a certain y-coordinate, on the straight lines are serially given to corresponding ones of the pixels 109 which are placed under the straight lines and have the same y-coordinate as of the corresponding points, respectively. Thus, a new plane P3 is produced between both of the planes P1 and P2. Further, information on the new plane is outputted to the final coordinate determination circuit 17. This process is repeated until a space between the planes P1 and P2 is completely filled with newly generated X-D planes. Thus, the x-D planes, which are discarded by the y-direction data compression circuit 13, undergo the enlargement/shrinkage in the Y-direction. Consequently, the image is restored by using the pixels to each of which the density changing at an average rate in the Y-direction correspondingly to each of the X-coordinates is given in the form in such a manner as to be ready for rotation. Namely, the density D of each of the pixels to be restored is computed according to the following equation:

$$= D_0 + \frac{\Delta y \cdot n \cdot (D_1 - D_0)}{N + \Delta n} \quad (2)$$

where D0 represents the density at the starting point of the vector; D1 represents the density at the terminal point of the vector; n designates the order, which is assigned to a pixel to be processed, from the starting point; N represents the interval between the densities D0 and D1 at the input side; Δn a fraction of an unprocessed part occurring correspondingly to the last pixel in the processing of the immediately preceding vector; and Δy=cos σ/My.

When the densities (D) corresponding to all of the pixels of one plane are generated by performing the operation in the y-direction pixel restoration circuit 16 in this way, output signals of this circuit is sent to the final coordinate determination circuit 17 whereupon the final coordinate positions (x, y) of each of the pixels are determined by adding an x-increment and a y-increment in the x-y coordinate system thereto correspondingly to each of the pixels according to the angle of rotation σ. Further, the coordinates of the starting point of each of the planes are determined by adding a starting-point x-coordinate increment and a starting-point y-coordinate increment thereto when initiating an operation of determining the coordinates of a new plane. Moreover, the rotation as illustrated in FIGS. 21(A) and 21 (B) is performed only when processing a first plane. Thus, when the number of pixels on each of the planes is N, an operation of setting the initial position or coordinates a of the starting point at (0, N tan σ) is performed.

Incidentally, FIG. 21(A) shows an image before the rotation thereof. Further, FIG. 21(B) shows the image after the rotation thereof. In these figures, the x-increment=1; the y-increment=tan σ; the starting-point x-coordinate increment=sin σ; and the starting-point y-coordinate increment cos σ.

Thus, data representing each of the pixels on each of the planes, whose final coordinates have been determined in this manner, are outputted to external apparatuses, such as the external storage device 1, through the input/output interface 2.

Therefore, in the case of the apparatus for performing the image processing method embodying the present invention, the enlargement and shrinkage of a reproduced image is achieved in each of the x-direction and the y-direction by setting Mx and My. When enlarging the reproduced image, the number of the pixels of this image increases in proportion to the magnification. In contrast, when shrinking the reproduced image, the number of the pixels of this image decreases in proportion to the magnification. Consequently, the enlargement and shrinkage of the image is attained without degrading the picture quality thereof. Furthermore, the number of pixels restored in each of the directions can be freely changed by altering Mx and My. Thus, a signal representing each of the pixels provided at the optimal density thereof can be supplied in accordance with the image density(or reslution) required by an image reproducing device to be combined with the apparatus.

Furthermore, to prevent occurrences of void hickeys at pixels, the final coordinate determination circuit 17 has a circuit configuration, by which sufficient operation accuracy is assured, and is adapted to perform the following operation. Namely, in the case that, for example, pixels included in the diagonally shaded portion 110a illustrated in FIG. 22 are restored by a certain vector, each time when the restored pixel is displaced to a different y-coordinate, the density of the resorted pixel 110a is redundantly given to a pixel 111 outside the displaced portion. For instance, when the coordinates (x, y) of the pixel to be restored by a single vector are changed to (x+1, y+1), the density of one of such pixels respectively located at the positions (x, y) and (x+1, y+1) is imparted to a pixel located at the place (x+1, y). Thus, the occurrences of void hickeys can be completely prevented. Consequently, the reproduction of an image, which cannot be distinguished by human eyes from an original image, is achieved by freely rotating thereof.

Figure 23A:
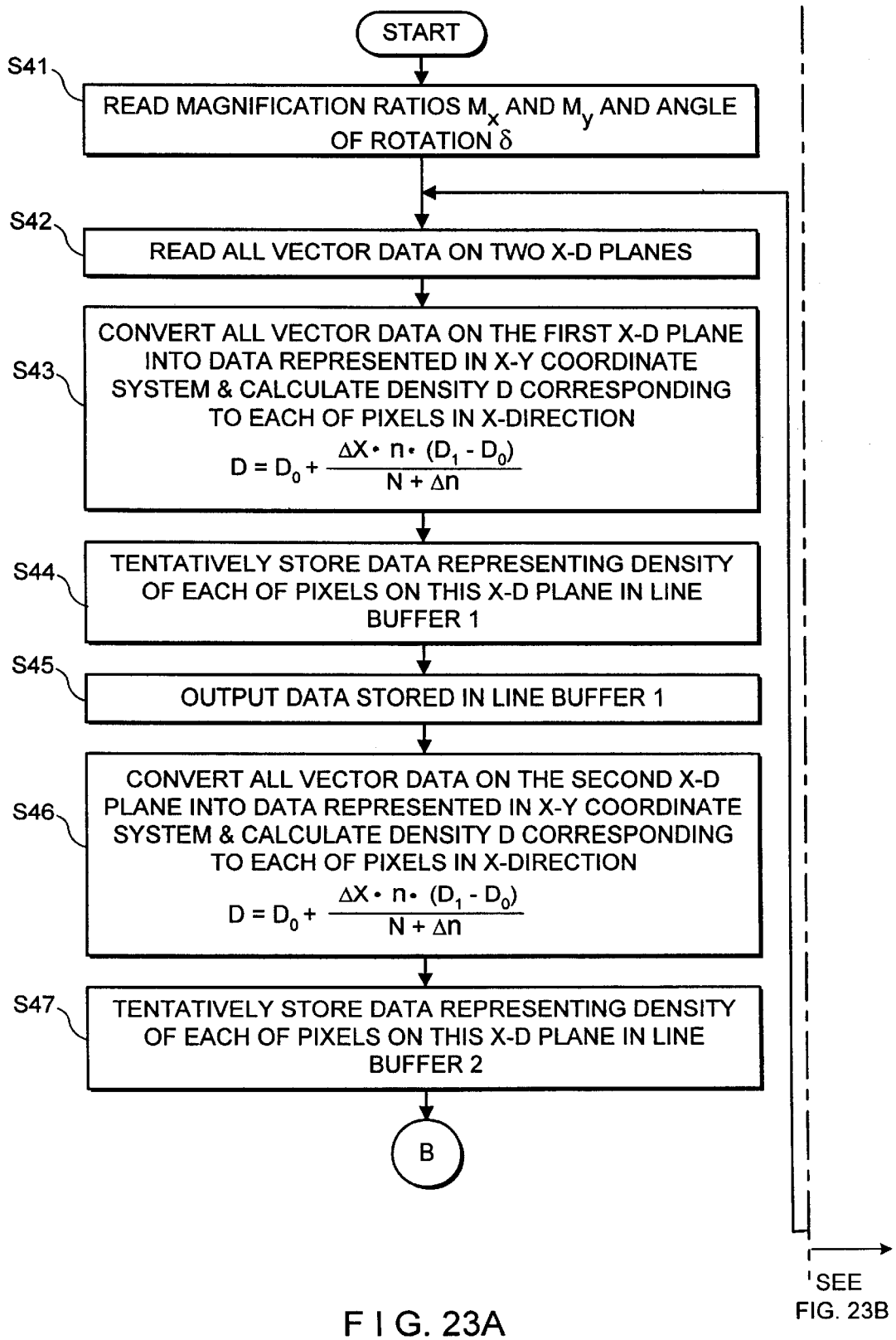
FIG. 23 is a flowchart illustrating an operation to be performed in x-direction and y-direction pixel restoration circuits.
Figure 23B:
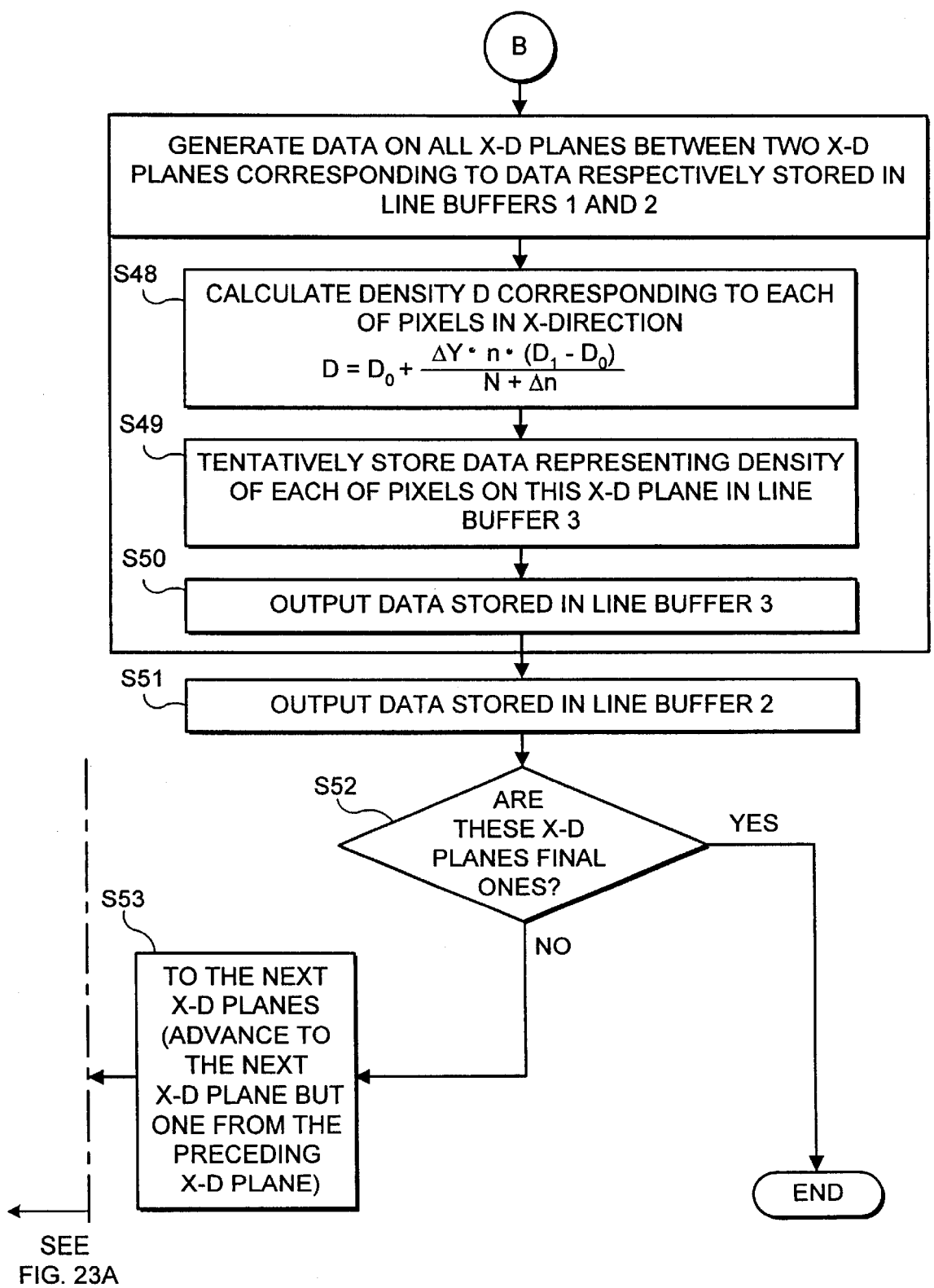

FIG. 23 is a flowchart illustrating operations to be performed in the x-direction pixel restoration circuit 15 and the y-direction pixel restoration circuit 16. The logic circuits of the operation processing portions 15b and 16b of the circuits 15 and 16 are configured in such a manner as to perform the operation in accordance with this flowchart.

In this case, first, in the x-direction pixel restoration circuit 15, the magnification in the x-direction Mx, the magnification in the y-direction My and the angle of rotation σ are read in step s41. Then, in step s42, all vector data on first two x-D planes are read. Subsequently, in step s43, all vector data on the x-D planes are converted or transformed into data represented in the X-Y coordinate system. Further, the density D of each of the pixels arranged in the x-direction under the line segments of the vectors is calculated by the aforementioned equation (1). Then, the density D of each of the pixels on the X-D planes is tentatively stored in a line buffer 1. The data stored in the line buffer 1 is outputted to the final coordinate determination circuit 17 through the y-direction pixel restoration circuit 16.

Subsequently, in step s46, all vector data on the next x-D plane are converted into data represented in the X-Y coordinate system. Moreover, the density D of each of the pixels arranged in the x-direction under the line segments of the vectors is calculated by the aforementioned equation (1). Then, the density D of each of the pixels on the X-D planes is tentatively stored in a line buffer 2.

Next, in the y-direction pixel restoration circuit 16, the density D of each of the pixels arranged in the X-direction on X-D planes, which are placed between the two X-D planes the data on the respective of which are stored in the line buffers 1 and 2, is calculated in step s48 by the aforementioned equation (2). Then, in step s49, the density D of each of the pixels on these X-D planes is temporarily stored in a line buffer 3. Subsequently, in step s50, the data stored in the line buffer 3 are outputted to the final coordinate determination circuit 17.

Upon completion of the process consisting of steps s48 to s50 performed on the data corresponding to all of the X-D planes, the data stored in the line buffer 2 are outputted to the final coordinate determination circuit 17 in step s51. Then, in step s52, it is judged whether or not the x-D planes are the last ones. If not, the apparatus returns to step s42 whereupon the circuits 15 and 16 start processing the next two x-D planes (namely, these circuits proceed to the processing of the x-D plane but one from the preceding x-D plane). In contrast, if it is decided in step s52 that the x-D planes are the last ones, the operations are finished.

Figure 24:
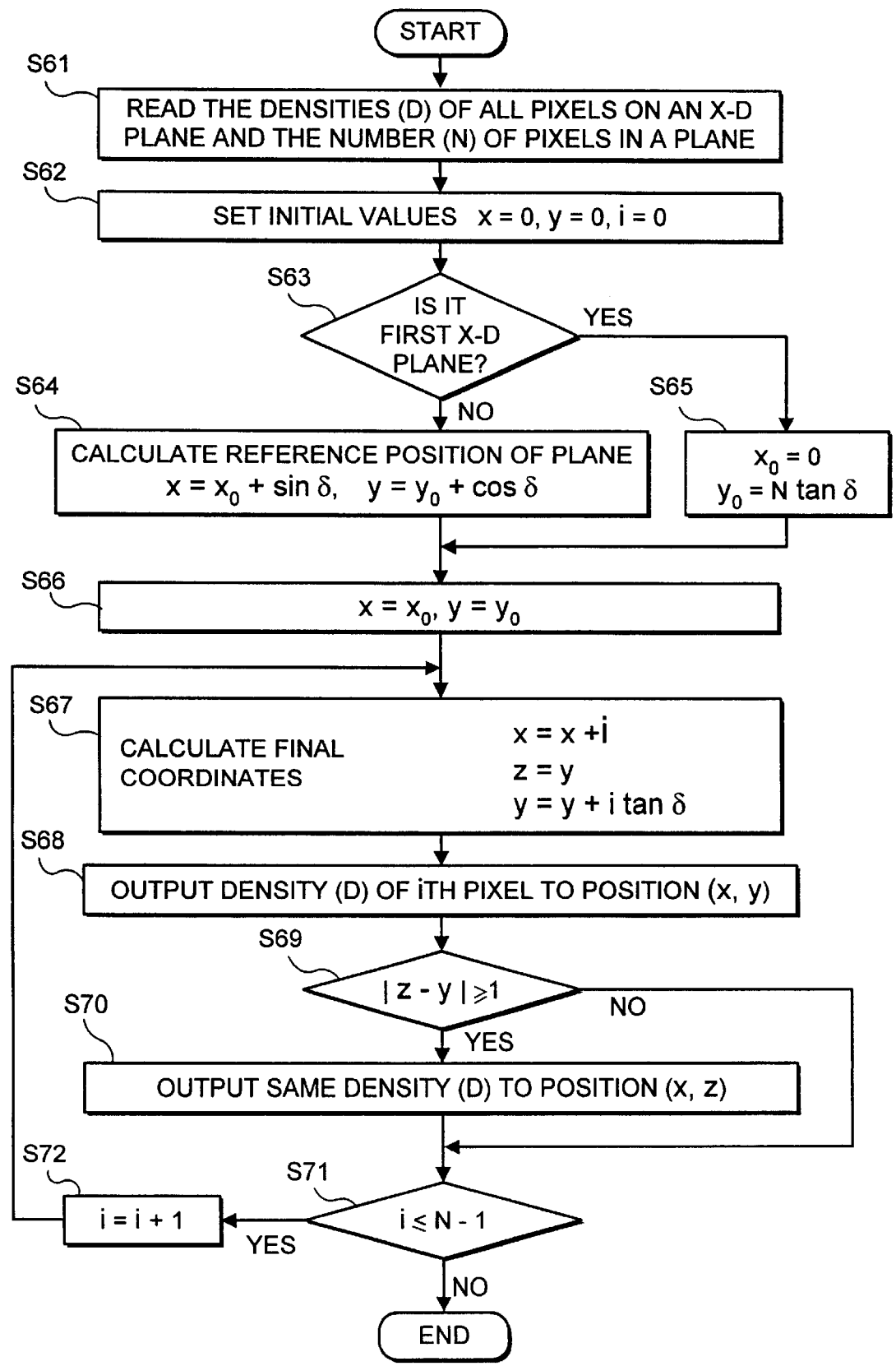
FIG. 24 is a flowchart illustrating an operation to be performed in the final coordinate determination circuit.

FIG. 24 is a flowchart illustrating an operation to be performed in the last coordinate determination circuit 17. Further, the logic circuit of the operation processing portion 17b is configured in such a way as to perform the operation in accordance with this flowchart.

In this circuit, data representing the densities (D) of all of the pixels on a X-D plane and data representing the number (N) of all of the pixels on a plane are read in step s61. Then, in step s62, the initial values (namely, x=0, y=0, i=0) are set. Subsequently, if it is decided that this X-D plane is not a first plane, the coordinates of the reference position of the plane are calculated as follows:

$$x0 = x0 + \sin \sigma;$$

and $$y0 = y0 + \cos \sigma.$$

In contrast, if it is judged in step s63 that the X-D plane is the first plane, the coordinates of the reference position are set in step s65 as follows:

$$x0 = 0; \text{ and } y0 = N \tan \sigma.$$

Then, in step s66, x and y are set as follows:

$$x = x0; \text{ and } y = y0$$

Subsequently, in step s67, the final coordinates (x, y) are calculated as follows:

$$x = x + i$$
$$z = y$$
$$y = y + i \cdot \tan \sigma$$

Next, in step s68, the density (D) of an ith pixel is outputted to the place (x, y). Then, in step s69, if $|y-z| \geq 1$, the same density (D) is outputted to the place (x, z) in step s71. If it is found in step s71 that $i \leq N-1$, the parameter i is updated in step s72 in such a way that i=i+1. Then, this circuit returns to step s67. In contrast, if NO in step s71, the operation is finished. Additionally, if NO in step s69, the circuit advances to step s71.

Incidentally, the foregoing description of this embodiment corresponds to the case where the angle of rotation σ is equal to or less than 45 degrees. However, in the case where the angle of rotation σ is more than 45 degrees, an angle of an integral multiple of 90 degrees is employed as a reference angle. Further, the aforementioned operations to be performed in the case of this embodiment are performed by subtracting the reference angle from the angle of rotation σ so that the resultant angle σ is not more than 45 degrees. Thereafter, when reproducing an image, the rotation is performed by adding the reference angle to this angle of rotation σ. Thus, the image can be freely rotated in the entire range of 360 degrees.

In accordance with the image processing method for processing a grayscale image according to the present invention, only signals representing pixels at places, at each of which a degree of variation in density abruptly changes, are selected and extracted. Further, signals representing pixels in a portion, in which the density changes at an average rate, are discarded. Thus, the quantity of data to be processed can be considerably reduced (namely, such data can be considerably compressed). Consequently, such data can be stored in a small capacity (or small-sized) memory unit. In the case that image signals are transferred by, for instance, data communication, transfer time can be greatly reduced.

Further, pixels are restored by changing the density at an average rate between each pair of adjacent two of selected places. Thus, a high-quality image, which is extremely close to an original image, can be reproduced as a restored image. Furthermore, it can be freely determined how many pixels a portion between the adjacent two places or points is to be generated when reproducing the image. Thus, the image processing method of the present invention has excellent advantageous effects in that the method has good ability to process, for example, enlarge and shrink an image at the time of reproduction thereof and in that the efficient combination of the numbers of pixels can be set for various kinds of image reproducing devices.

Further according to the present invention, the data amount of image signals can be greatly compressed because the change of degree of variation of density of the pixels with respect to the x-coordinate is compared with a predefined threshold and the data in the series of intervals in which the change of degree is less than the predefined threshold is represented by one vector.

Also as the degree of variation of the density does not substantially change in the series of intervals, high-quality image which is extremely similar to the original image can be reproduced.

Further according to the present invention, a high quality image which is extremely similar to the original image can be reproduced because the pixels between the two adjacent points in the compressed data signals are restored by giving average-changing densities thereto.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. An image processing method for processing a grayscale image comprises the steps of:

dividing a grayscale image on an x-y plane into fine pixels and then receiving input image signals obtained by converting densities (D) of said pixels into multi-value digital signals, respectively;

extracting a relation between an x-coordinate and a density (D) by setting a y-coordinate as being constant;

comparing a change in a degree of variation in a density (D) for x-coordinates with a predefined threshold by: first performing a macro comparison by dividing the x-coordinates into predefined wide intervals; and then performing a micro comparison by subdividing each of the intervals in each of which the average relation between the x-coordinate and the density (D) can neither be obtained nor represented by a vector representation;

obtaining and representing an average relation between the x-coordinate and the density (D) in each of a sequence of intervals, in which the change in the degree is less than the predefined threshold, by a vector; and outputting a vector represented signal.

2. The image processing method for processing a grayscale image according to claim 1, wherein said step of comparing the change in the degree of variation is performed again on all of vectors, which has been obtained in said sub-steps of performing the macro comparison and of performing the micro comparison by means of vector representations on a x-D plane.

3. The image processing method for processing grayscale image according to claim 2, wherein said predefined threshold is variable.

4. The image processing method of claim 1, wherein the multi-value digital signals are generated from data compressed and stored in an external storage device in a format in which brightness changes are encoded in a vector data format independent from individual coordinates of said pixels.

5. The image processing method for processing grayscale image according to claim 1, wherein said predefined threshold is variable.

* * * * *